US008430324B2

(12) United States Patent
Baba et al.

(10) Patent No.: US 8,430,324 B2
(45) Date of Patent: Apr. 30, 2013

(54) RFID TAG MANUFACTURING METHOD AND RFID TAG

(75) Inventors: Shunji Baba, Kawasaki (JP); Shigeru Hashimoto, Inagi (JP); Yoshiyasu Sugimura, Inagi (JP); Satoru Nogami, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 494 days.

(21) Appl. No.: 12/567,989

(22) Filed: Sep. 28, 2009

(65) Prior Publication Data

US 2010/0078487 A1    Apr. 1, 2010

(30) Foreign Application Priority Data

Oct. 1, 2008 (JP) ................... 2008-255891

(51) Int. Cl.
*G06K 19/06* (2006.01)
*G06K 5/00* (2006.01)

(52) U.S. Cl.
USPC .......................................... 235/492; 235/380

(58) Field of Classification Search ............... 235/492, 235/487, 380; 257/778; 438/222, 336, 62; 156/265

See application file for complete search history.

(56) References Cited

U.S. PATENT DOCUMENTS

| | | | | |
|---|---|---|---|---|
| 5,585,618 | A * | 12/1996 | Droz | 235/492 |
| 6,019,865 | A * | 2/2000 | Palmer et al. | 156/265 |
| 6,140,146 | A * | 10/2000 | Brady et al. | 438/62 |
| 6,250,554 | B1 * | 6/2001 | Leo et al. | 235/487 |
| 6,293,470 | B1 * | 9/2001 | Asplund | 235/487 |
| 6,509,630 | B1 * | 1/2003 | Yanagisawa | 257/668 |
| 7,845,569 | B1 * | 12/2010 | Warther et al. | 235/492 |
| 2002/0168513 | A1 * | 11/2002 | Hattori et al. | 428/336 |
| 2005/0093172 | A1 * | 5/2005 | Tsukahara et al. | 257/778 |
| 2006/0148166 | A1 * | 7/2006 | Craig et al. | 438/222 |

FOREIGN PATENT DOCUMENTS

| | | |
|---|---|---|
| JP | 10181261 A | 7/1998 |
| JP | 2000-085283 A | 3/2000 |
| JP | 2000-172819 A | 6/2000 |
| JP | 2000200333 A | 7/2000 |
| JP | 2001-319211 A | 11/2001 |
| JP | 2002-187223 A | 7/2002 |
| JP | 2002-216097 A | 8/2002 |
| JP | 2002-298107 A | 10/2002 |
| JP | 2003141486 A | 5/2003 |
| JP | 2008-159007 A | 7/2008 |

OTHER PUBLICATIONS

Korean Office Action dated Feb. 1, 2011, issued in corresponding Korean Patent Application No. 10-2009-0090134.

Japanese Office Action dated Nov. 13, 2012, issued in corresponding application No. 2008-255891, with English Translation.

Partial translation only of JP 2008-159007A dated Jul. 10, 2008.

* cited by examiner

*Primary Examiner* — Thien T Mai
(74) *Attorney, Agent, or Firm* — Westerman, Hattori, Daniels & Adrian, LLP

(57) ABSTRACT

A method of manufacturing RFID tags. A base sheet member is formed by fixedly attaching unit base substrates to a belt-like first sheet member at predetermined space intervals. Each unit base substrate is formed with an antenna pattern and has a non-contact communication-type IC chip mounted thereon. An upper-layer sheet member is formed by arranging reinforcing members between elastic, belt-like second and third sheet members, and is laminated on a surface of the first sheet member toward the unit base substrates such that each IC chip and each reinforcing member overlap each other in plan view. Regions each containing one unit base substrate are sequentially cut out from a laminate of the upper-layer sheet member and the base sheet member, thereby making RFID units.

13 Claims, 29 Drawing Sheets

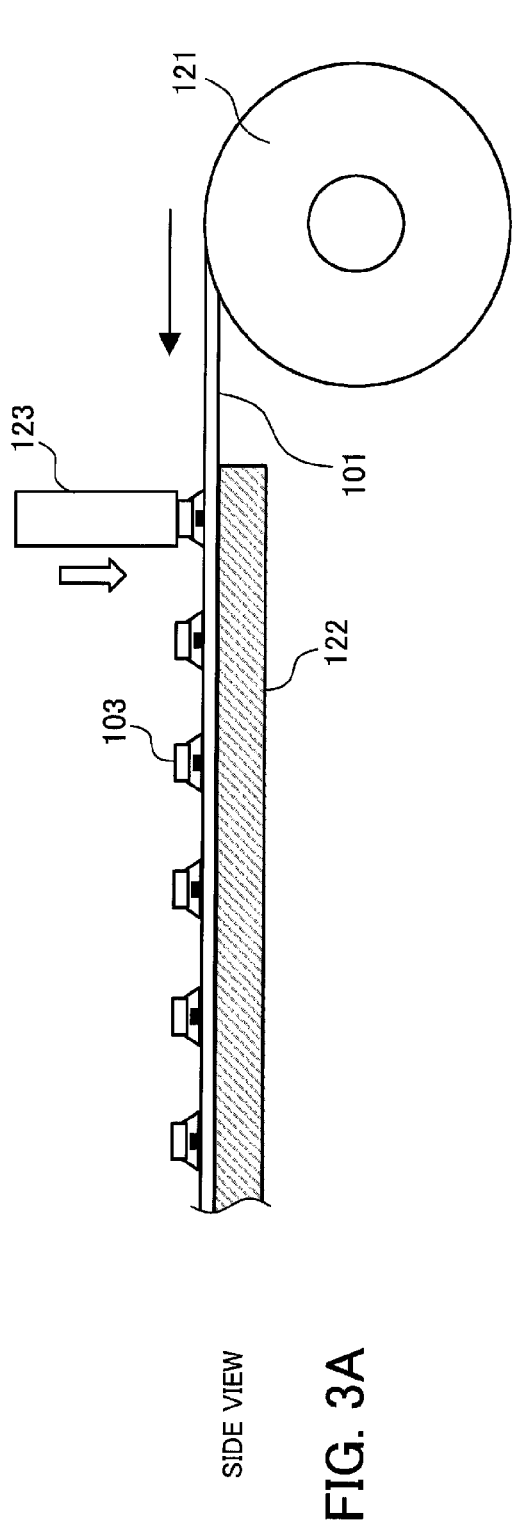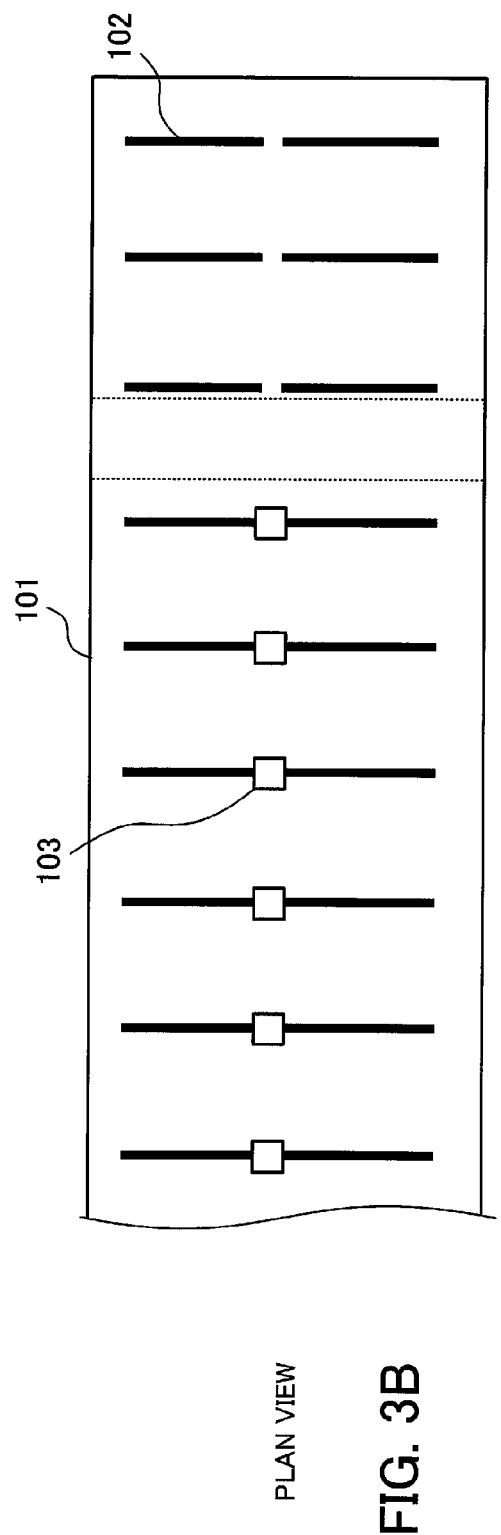
SIDE VIEW
FIG. 3A
PLAN VIEW
FIG. 3B

SIDE VIEW

PLAN VIEW

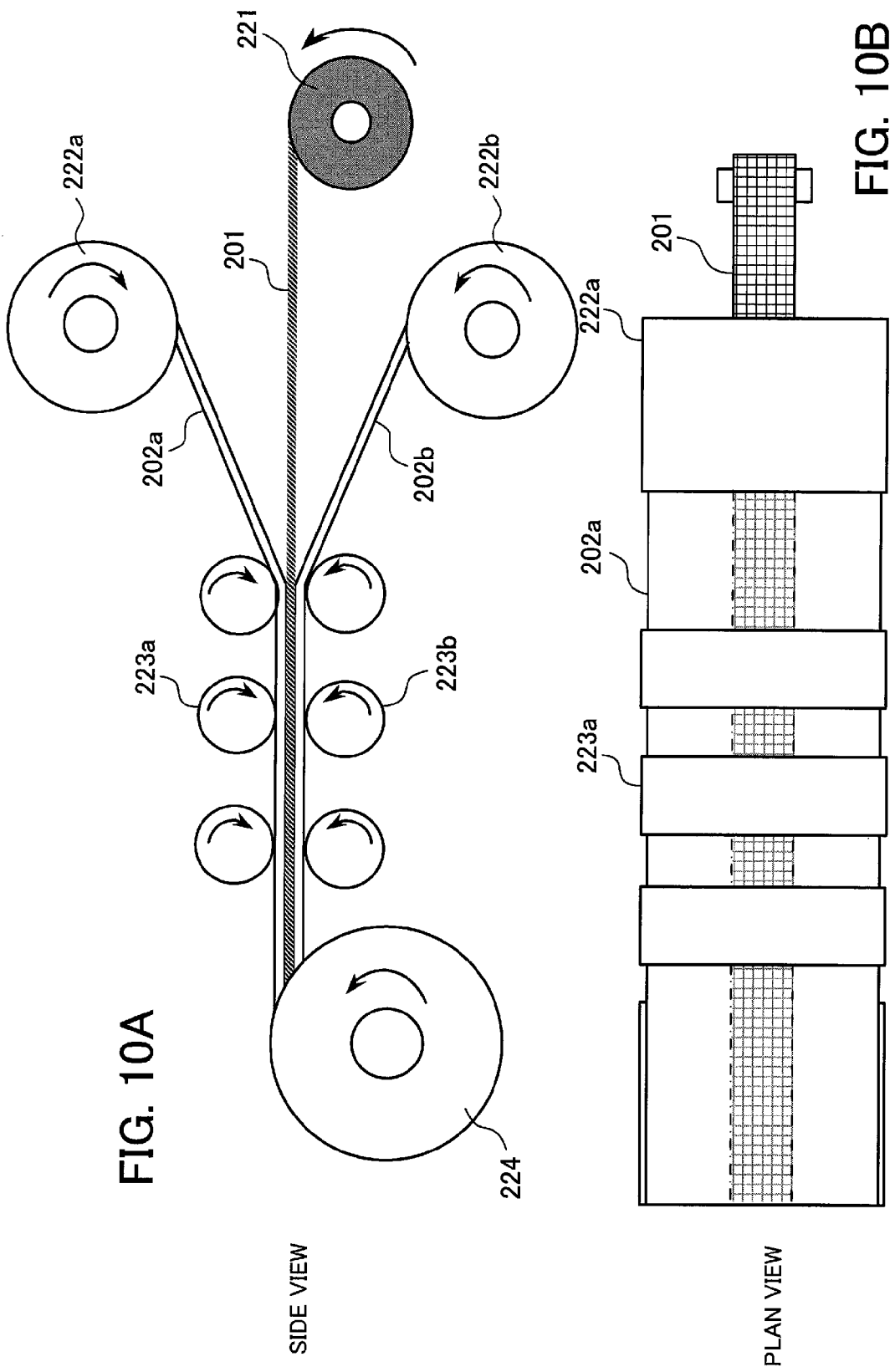

SIDE VIEW

PLAN VIEW

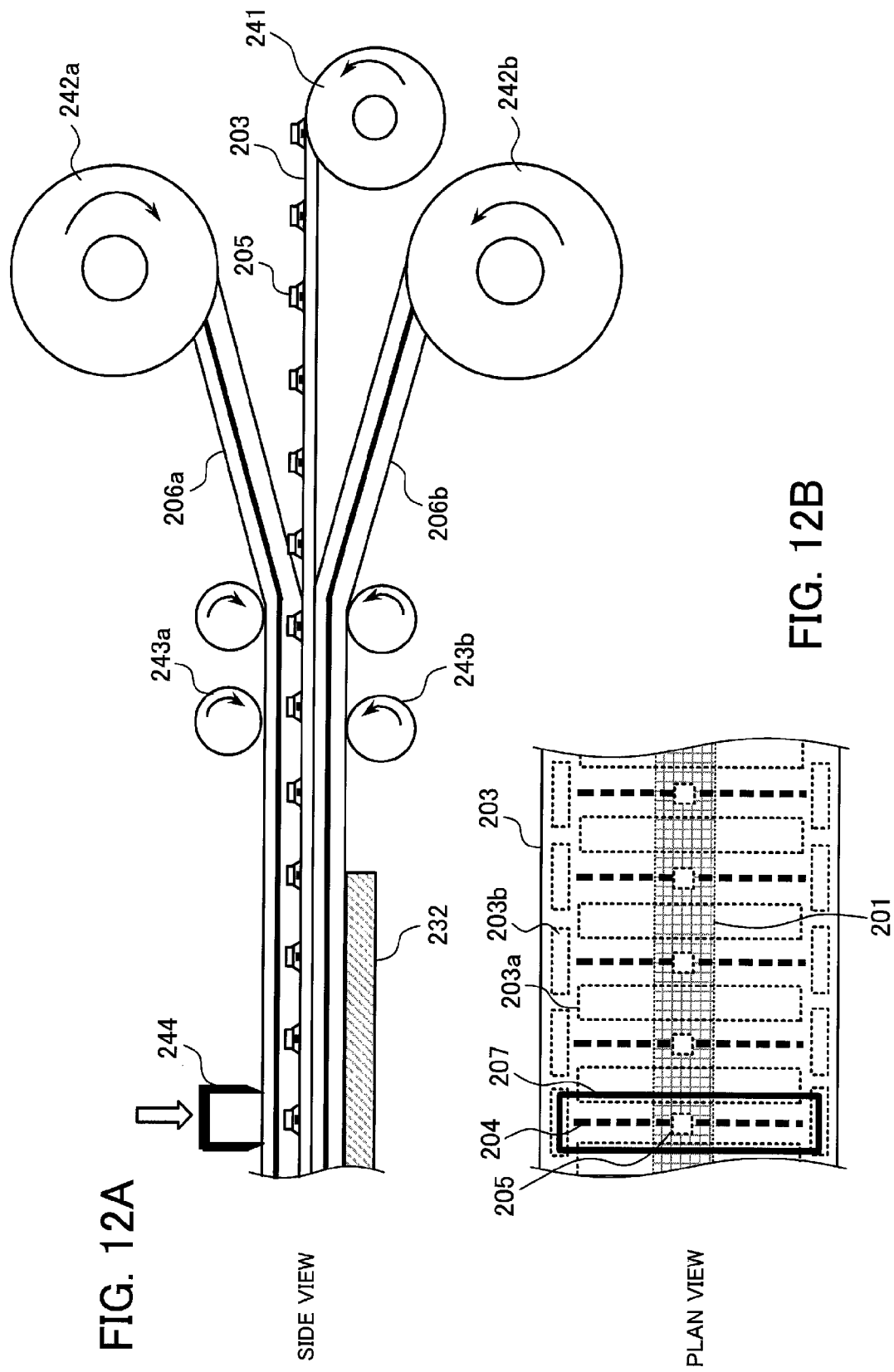

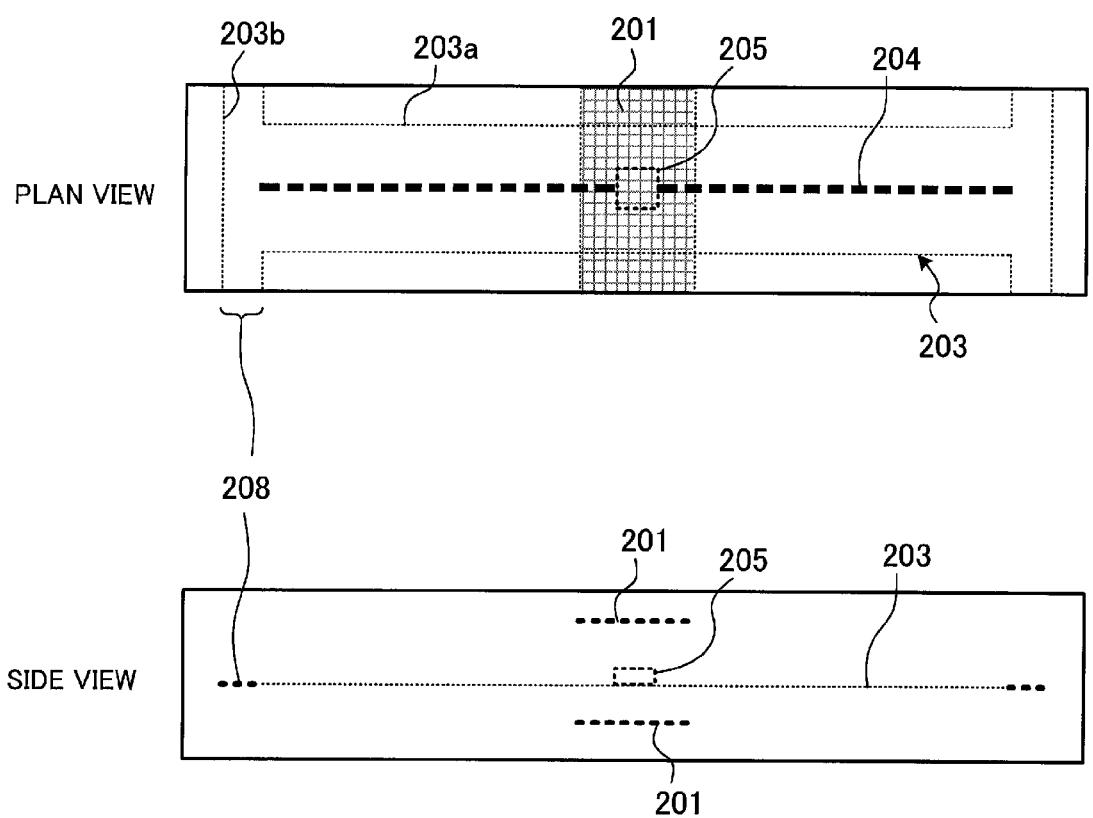

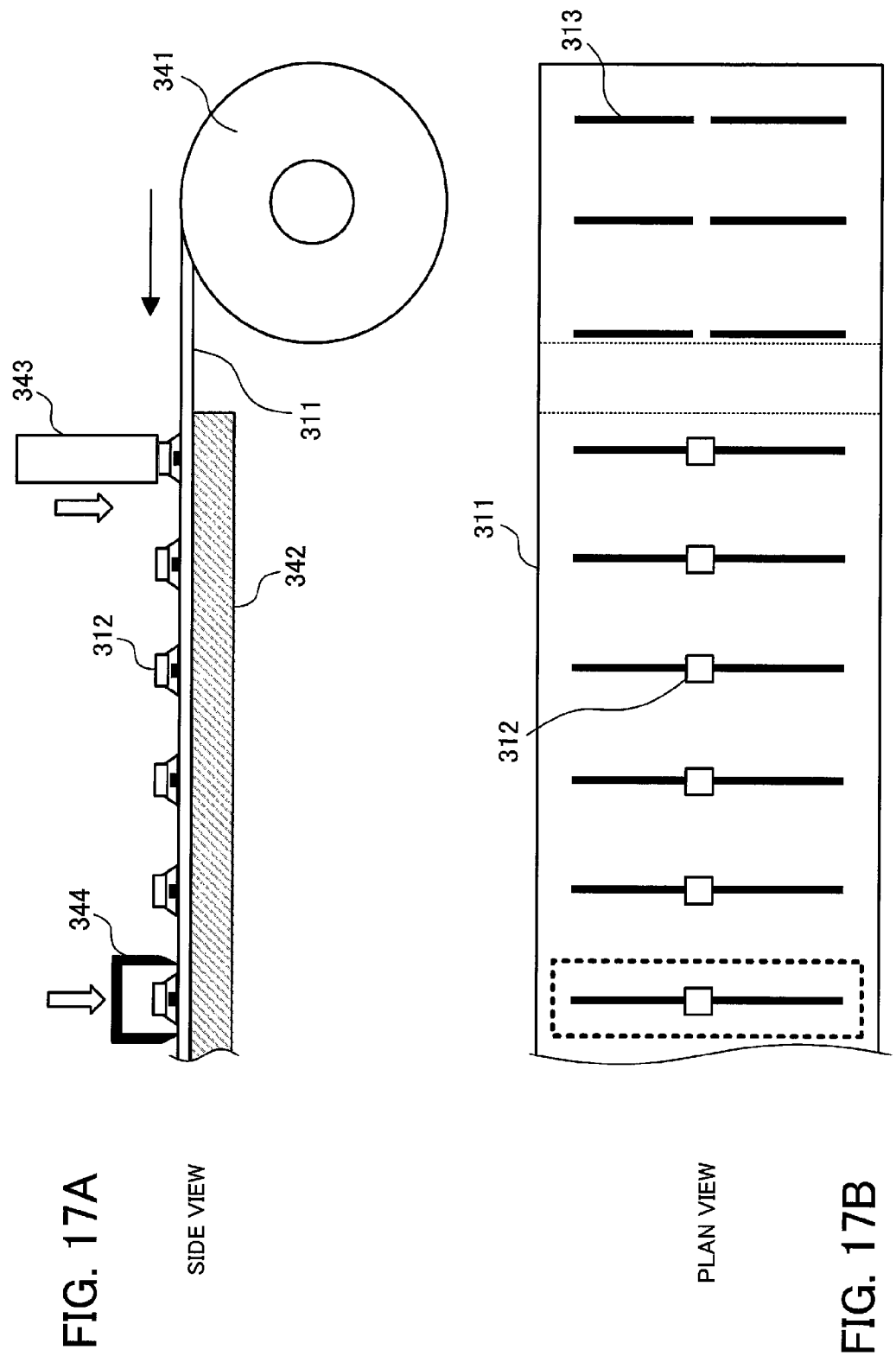
FIG. 17A SIDE VIEW
FIG. 17B PLAN VIEW

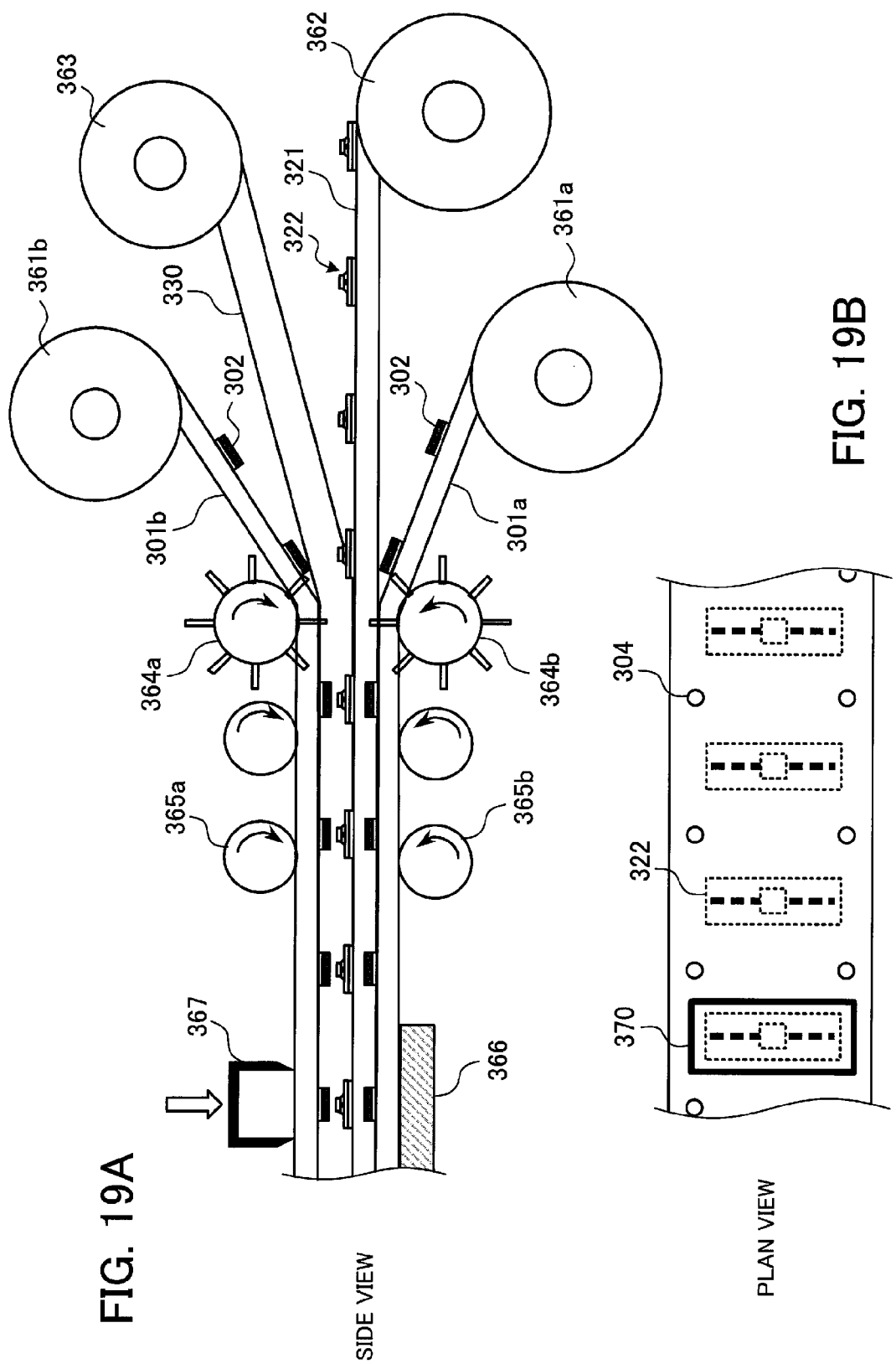

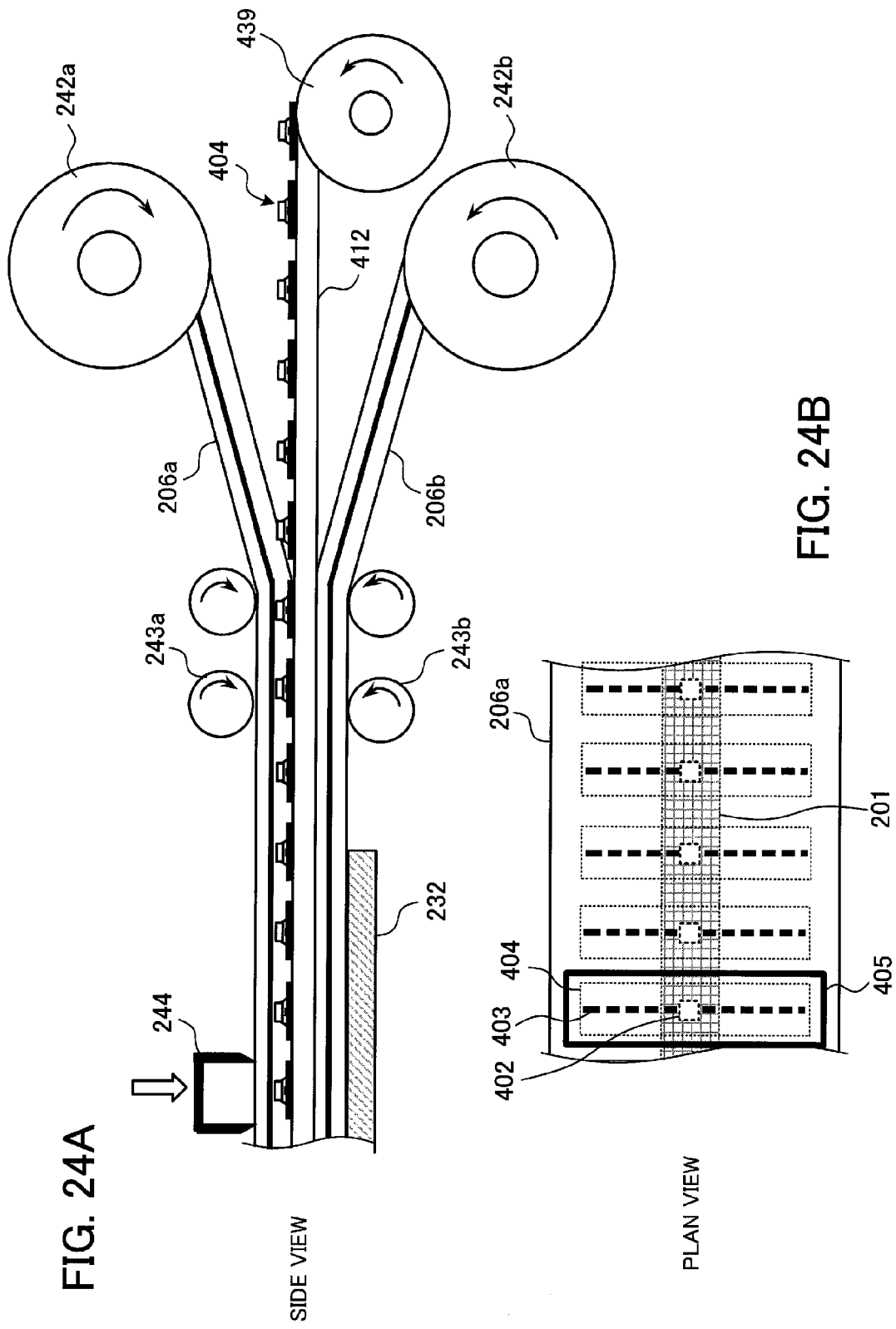

SIDE VIEW

PLAN VIEW

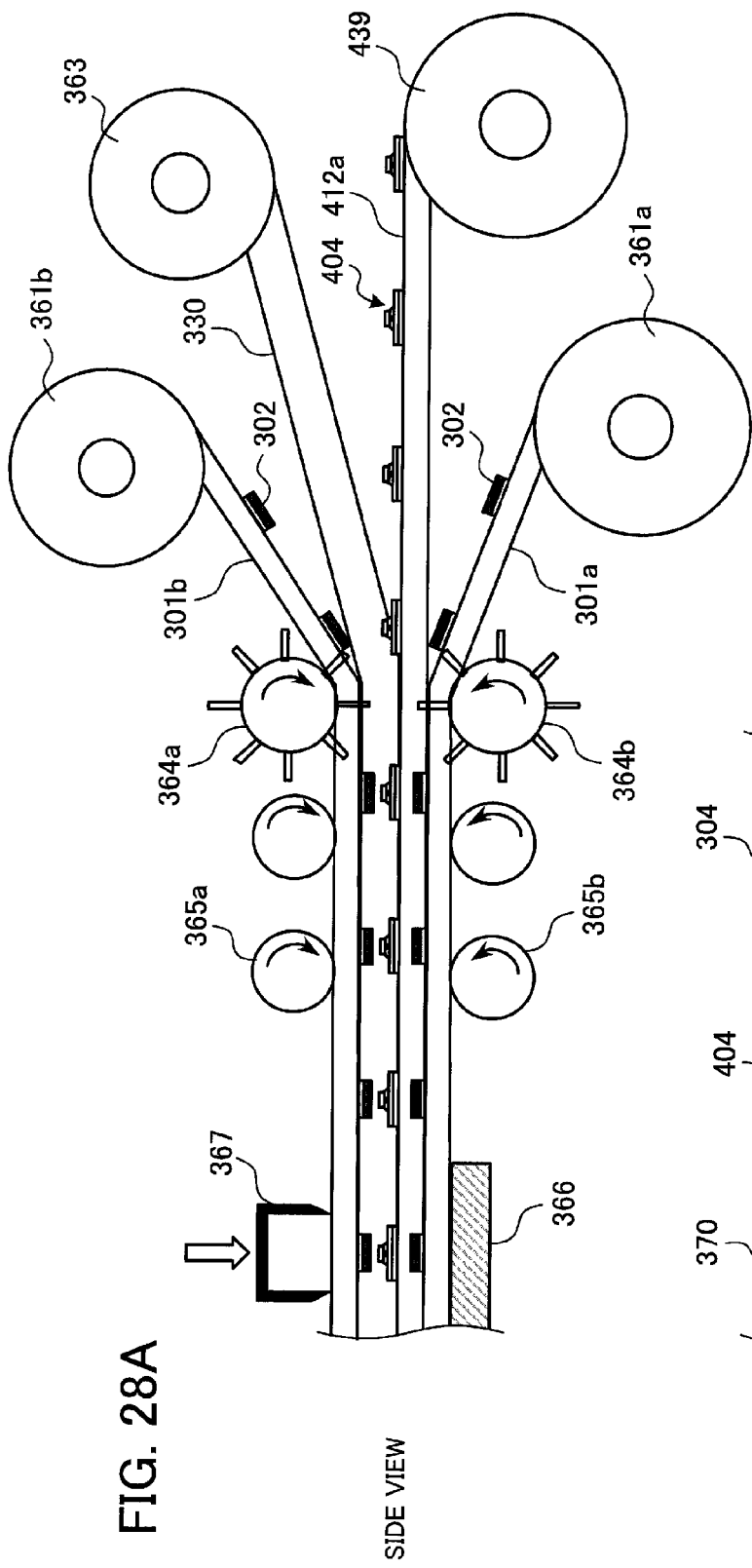
FIG. 28A SIDE VIEW
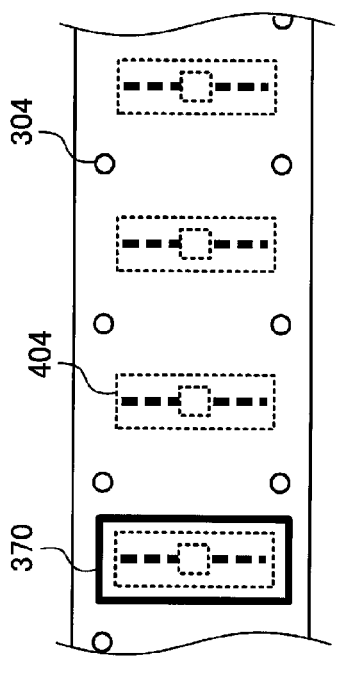
FIG. 28B PLAN VIEW

RFID TAG MANUFACTURING METHOD AND RFID TAG

CROSS-REFERENCE TO RELATED APPLICATIONS

This application is based upon and claims the benefit of priority of the prior Japanese Patent Application No. 2008-255891, filed on Oct. 1, 2008, the entire contents of which are incorporated herein by reference.

FIELD

The embodiments discussed herein are related to a method of manufacturing an RFID tag including a circuit chip for noncontact communication with an external device, and the RFID tag.

BACKGROUND

Recently, attention has come to be paid to IC (Integrated Circuit) chips that are capable of contactlessly transferring and receiving information to and from external devices. For example, IC cards having such non-contact IC chips provided in card substrates thereof are widely used in electronic money, season tickets for transit systems, admission cards, and so forth.

Further, it has been proposed to cause such an IC chip to store an ID to thereby use the IC chip for identification and management of a commercial article or the like. A Non-contact IC chip thus used is referred to as an "RFID (Radio Frequency ID) tag". In general, the RFID tag generates driving power based on radio waves or electromagnetic waves from a reader, and performs wireless communication with the reader, to transmit information, such as an ID stored in a memory of the IC chip, to the reader. Further, examples of the RFID tag include one which is capable of writing information in the memories of the IC chips, and one which is capable of executing processing, such as authentication processing with external devices, using received information or information stored therein.

By the way, many IC cards having non-contact IC chips installed therein are configured such that IC chips and antennas for communication are provided between card substrates made of resin. Further, as an IC card configured as above, to enhance the mechanical strength of the IC card, there has been proposed an IC card which is configured to sandwich both surfaces of the IC chip using a reinforcing member such as metal (see e.g. Japanese Laid-open Patent Publication No. 2003-141486). Further, it has been proposed that a reinforcing plate, which opens in portions thereof corresponding to electrodes of an IC chip, is directly joined to a main surface of the IC chip to thereby reduce the thickness of an IC card (see e.g. Japanese Laid-open Patent Publication No. 2000-200333). Further, there has been proposed an IC card which has a fiber material provided as a reinforcing material between a module package and a card substrate that have an IC chip and coils installed therein (see e.g. Japanese Laid-Open Patent Publication No. H10-181261).

On the other hand, in general, RFID tags as well are provided in a form in which an IC chip is integrally modularized e.g. with a communication antenna. Such a RFID tag as well is required to enhance the strength thereof with respect to a bending force and the like. Furthermore, it is designed to attach a RFID tag e.g. to clothing. Such RFID tags are further required to have resistance to liquids or chemicals. To solve these problems, it is proposed to manufacture RFID tags each by laminating reinforcing members and an IC chip one upon another and sealing a module having the IC chip integrated therein with a protective sheet.

However, it takes labor and time to manufacture the RFID tags each having reinforcing members arranged therein and an internal circuit sealed with a protective sheet, which results in an increase in manufacturing costs thereof.

For example, when a RFID tag is made, although a sheet-like substrate itself, which is formed with antenna patterns in advance, can be prepared with such a small thickness that enables the same to be wound around a roll or the like. However, when an IC chip is attached to the sheet-like substrate, and reinforcing members are mounted on the IC chip, both the IC chip and the reinforcing members have large bending resistances, which makes it difficult to cause the sheet-like substrate to be taken up by a roll again. Therefore, for example, a sealing process using a protective sheet is required to be performed by batch processing after the sheet-like substrate is cut in units of one or a plurality of IC chips. As described above, when it is impossible to continuously laminate reinforcing members and protective sheets in a state where a sheet-like substrate is wound around a roll, it is difficult to manufacture a large number of RFID tags at low cost.

SUMMARY

According to an aspect of the invention, a method of manufacturing an RFID tag includes forming a base sheet member that includes unit base substrates each of which is formed with a conductive pattern functioning as an antenna, and has a non-contact communication-type circuit chip mounted thereon which is connected to the conductive pattern, and a first sheet member in a belt-like form, the unit base substrates being fixedly attached to the first sheet member at predetermined space intervals along a direction of length of the first sheet member, laminating a second sheet member and a third sheet member each in a belt-like form and having elastic properties, one upon another, in a state where reinforcing members for reinforcing the circuit chips are arranged between the second sheet member and the third sheet member at the same space intervals as the space intervals at which the circuit chips are arranged, thereby forming an upper-layer sheet member, and laminating the upper-layer sheet member on a side of the base sheet member formed by the forming where each unit base substrate is laminated, in a state where each circuit chip and each reinforcing member overlap upon each other in plan view of the sheet members, and cutting out regions each including one of the unit base substrates sequentially from a sheet laminate formed by the laminating.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 1 is a cross-sectional view of an RFID tag according to a first embodiment;

FIG. 2 explains a method of manufacturing the RFID tag according to the first embodiment;

FIGS. 3A and 3B explain an IC chip-mounting process step in a general RFID tag-manufacturing process;

FIG. 4 explains a process step for mounting reinforcing members in the general RFID tag-manufacturing process;

FIGS. 5A and 5B explain a process step for cutting out RFID inlets in the general RFID tag-manufacturing process;

Figure 8A:
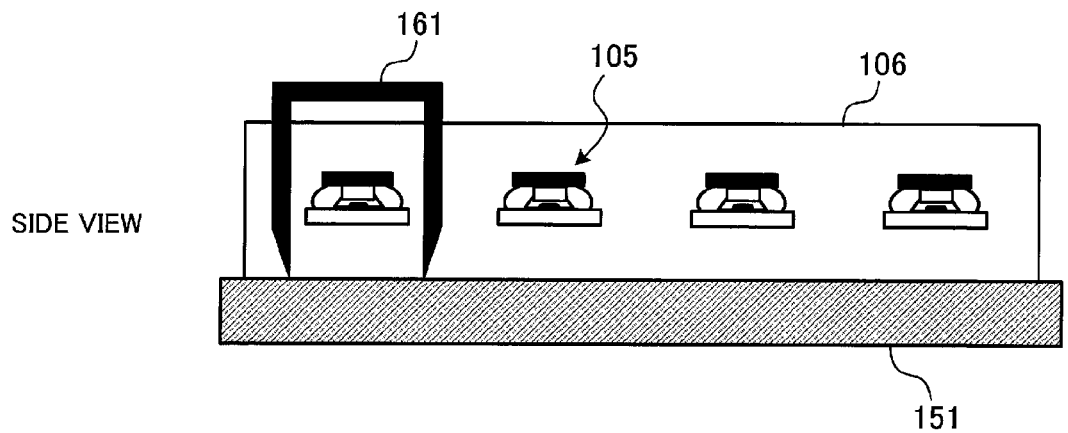
Figure 8B:
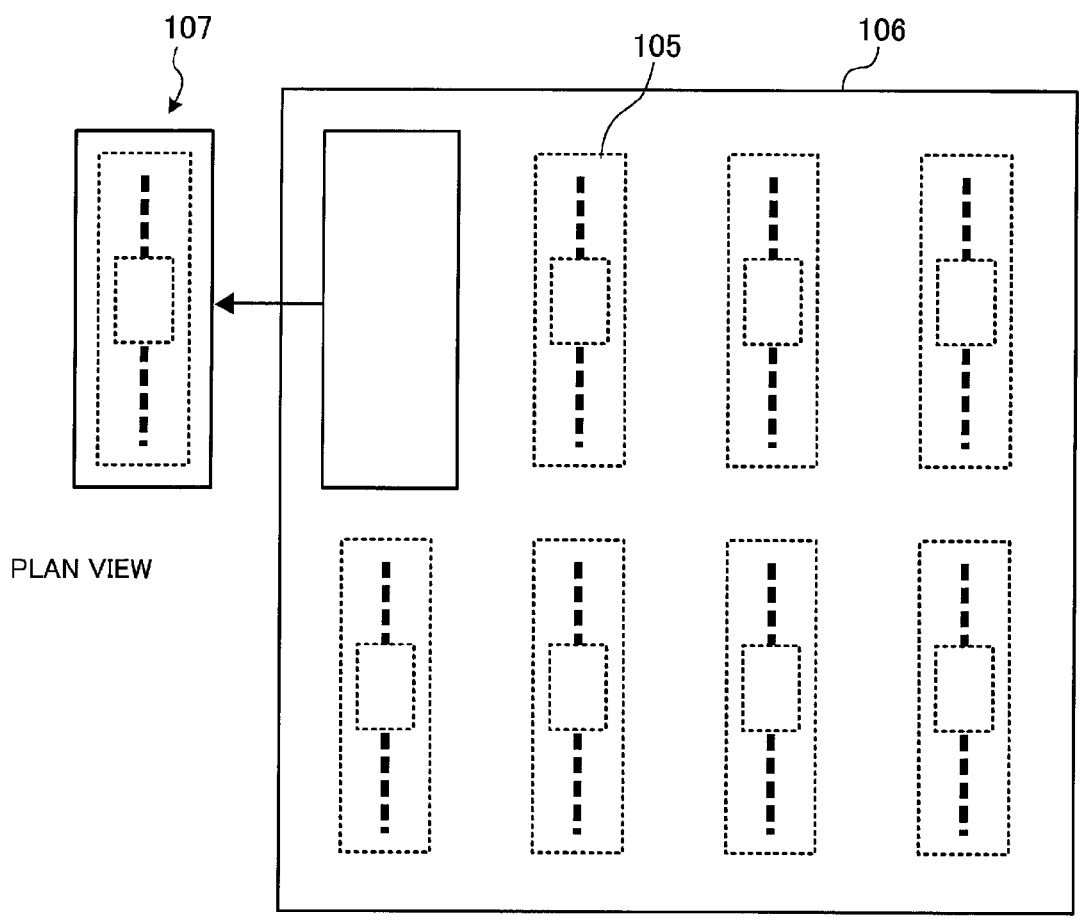
Figure 9:
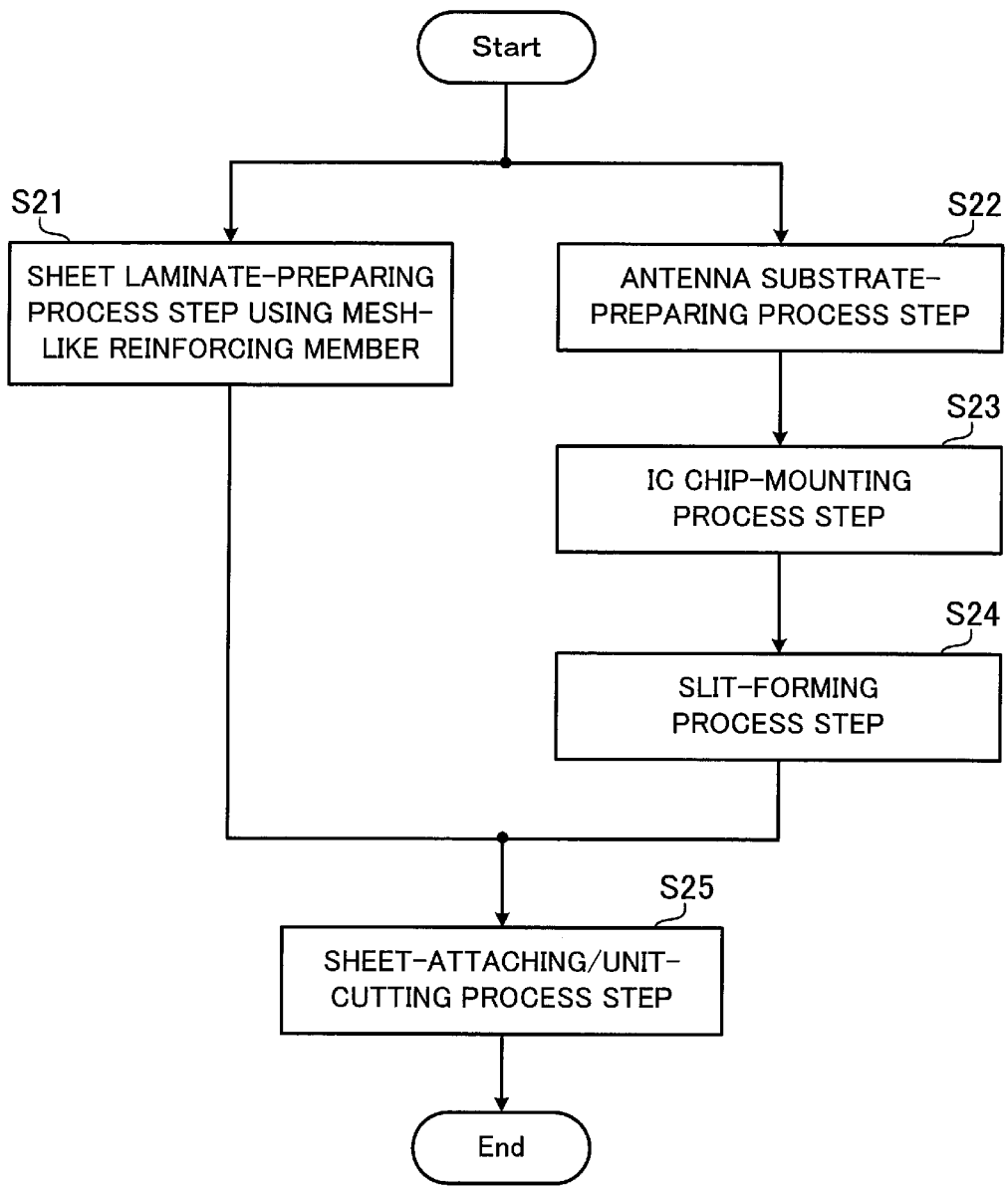
Figure 11A:
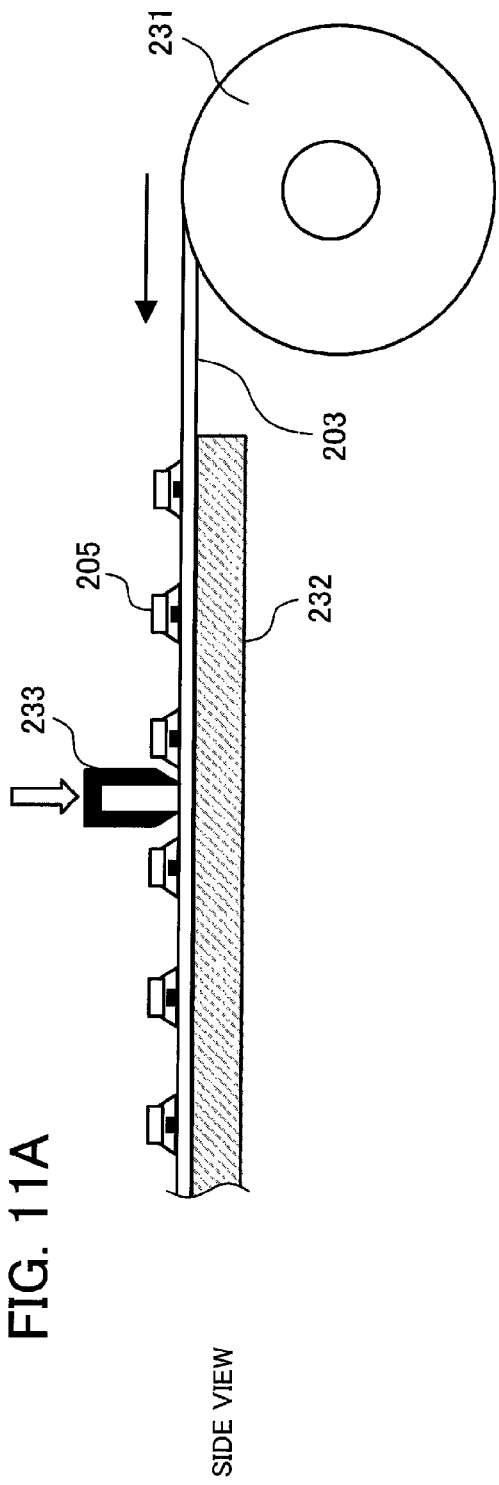
Figure 11B:
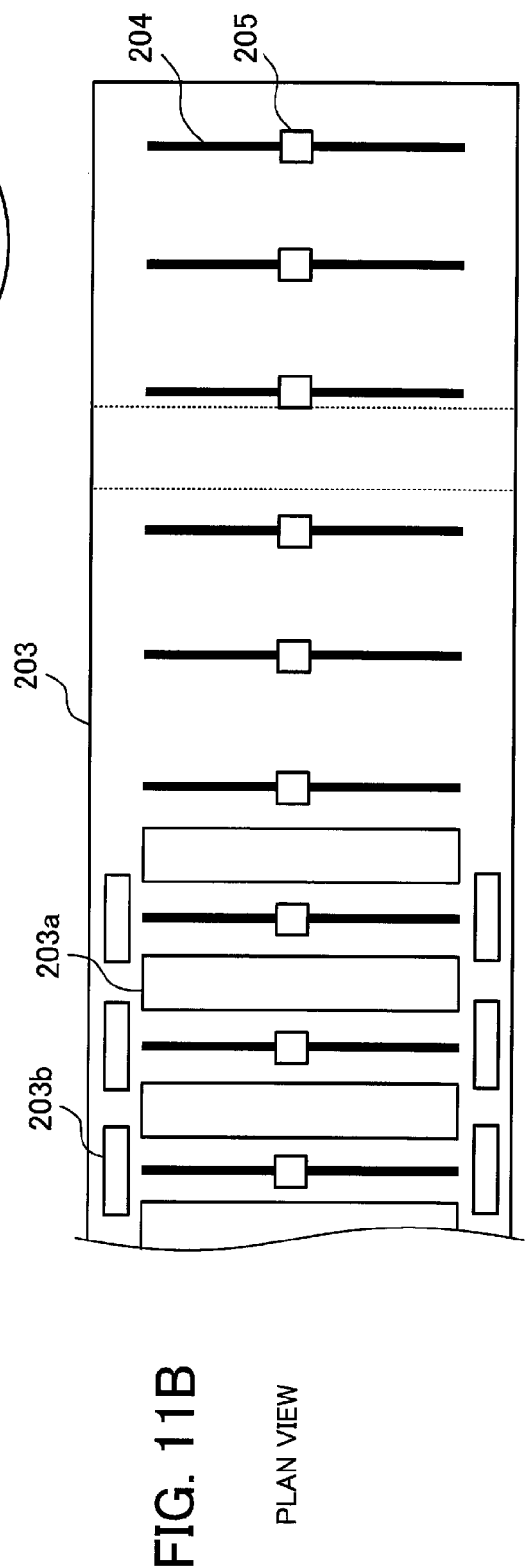
Figures 14A, 14B:
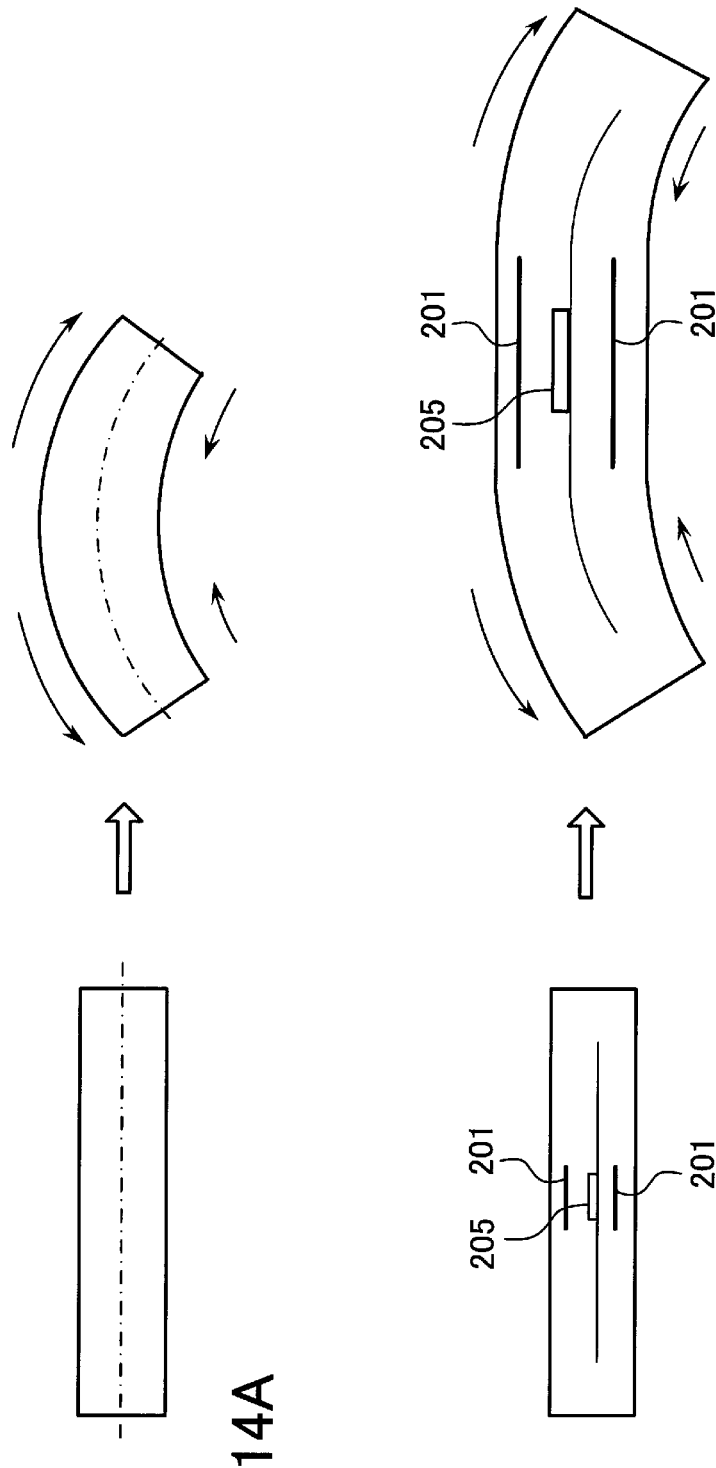
Figure 15:
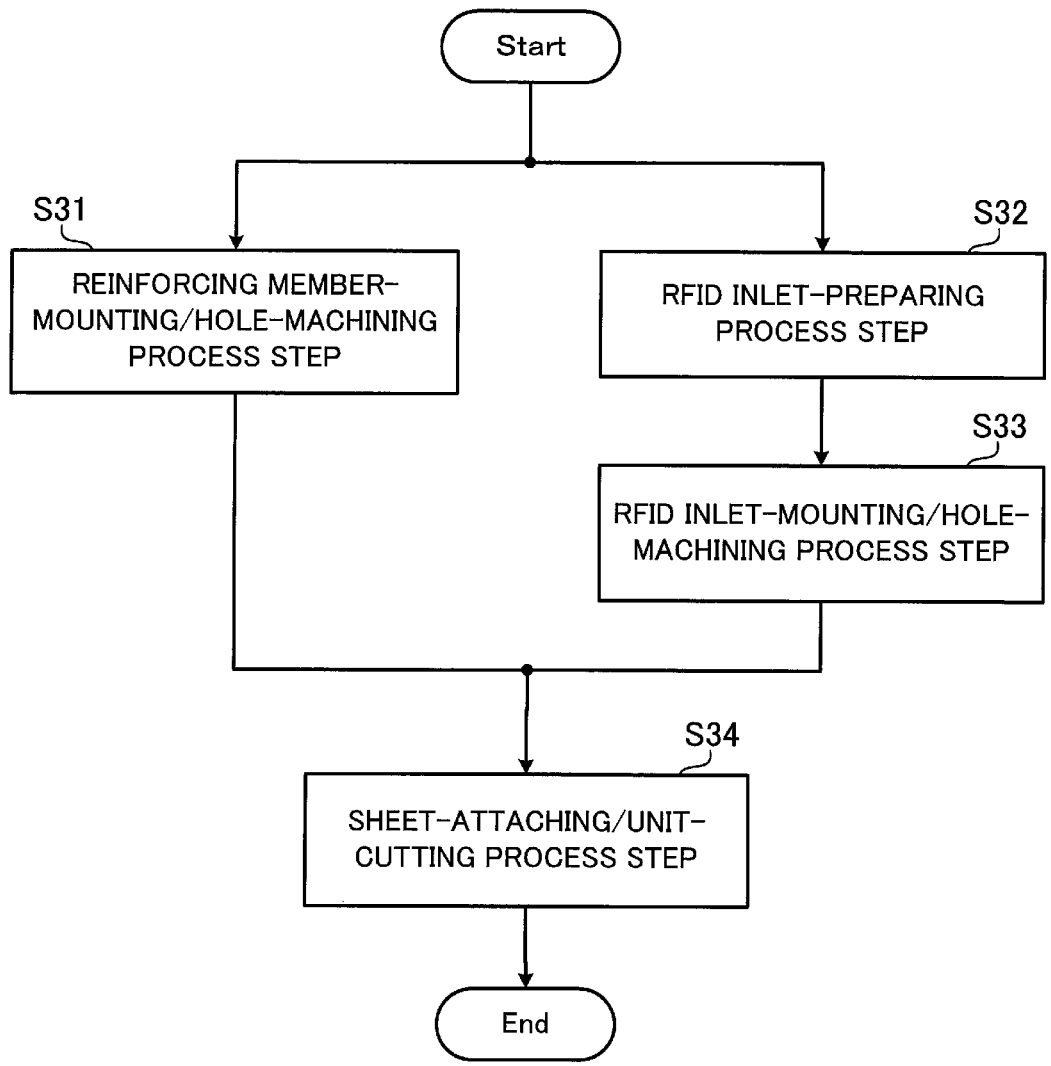
Figure 16A:
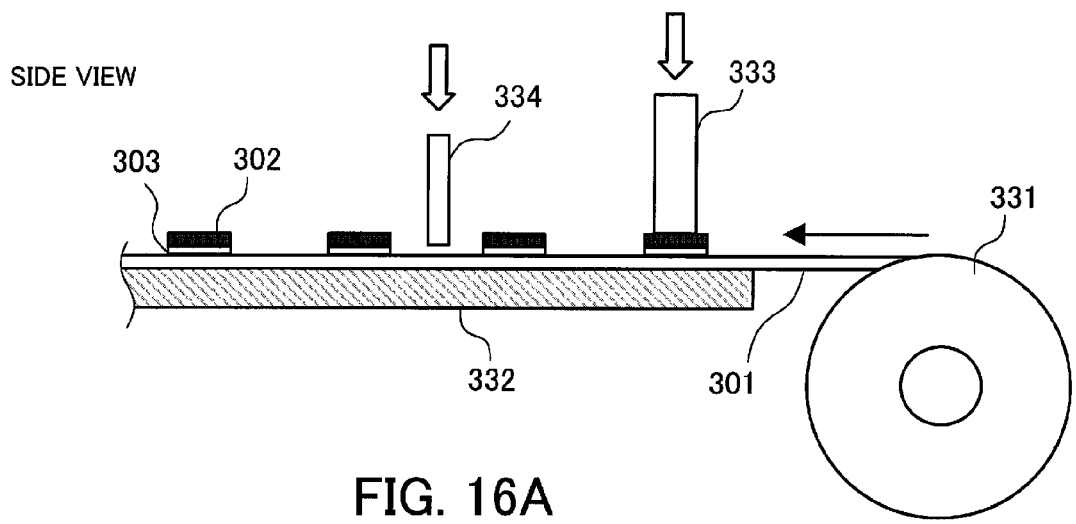
Figure 16B:
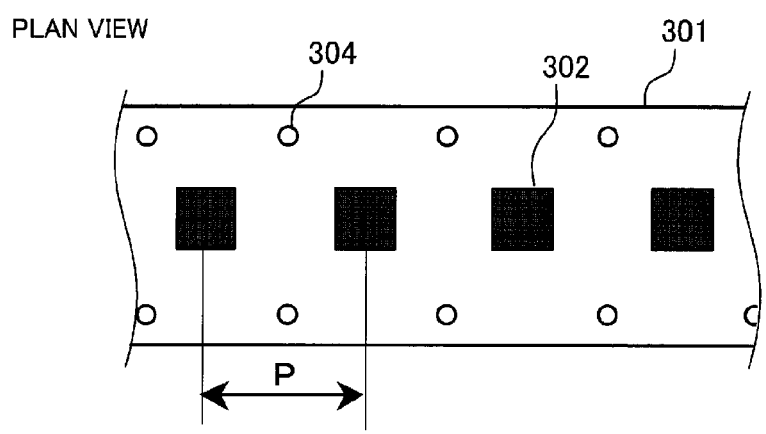
Figure 18A:
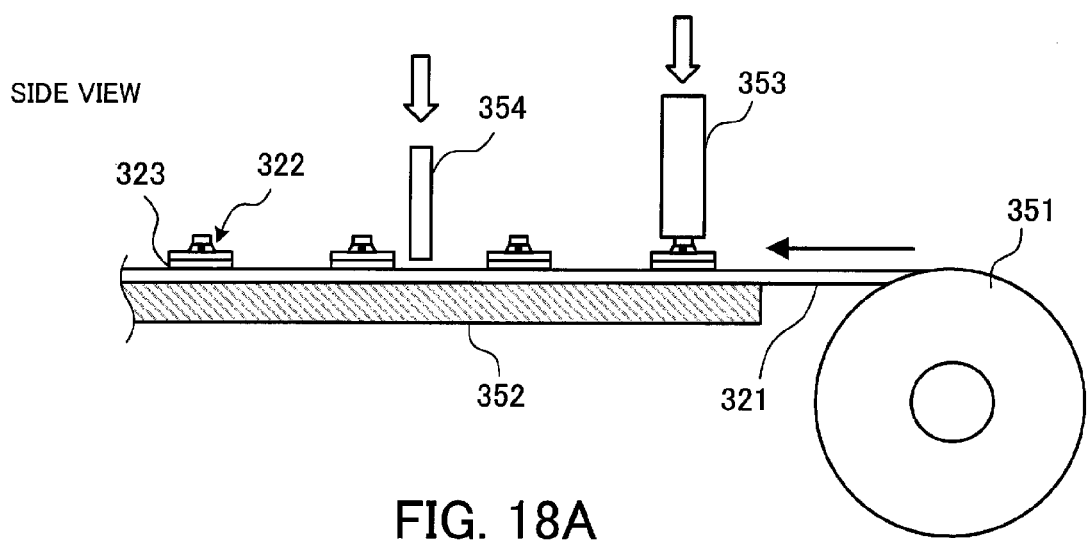
Figure 18B:
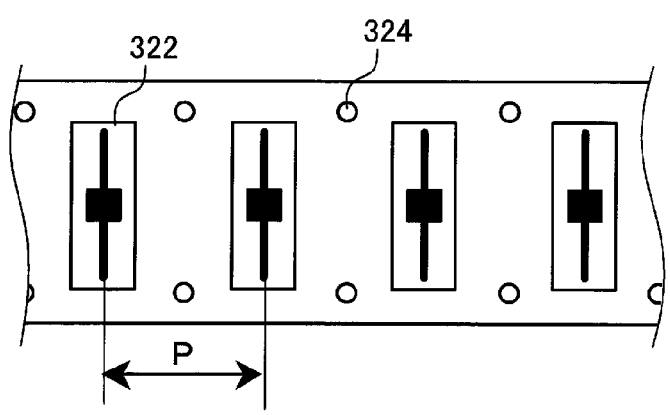
Figure 20A:
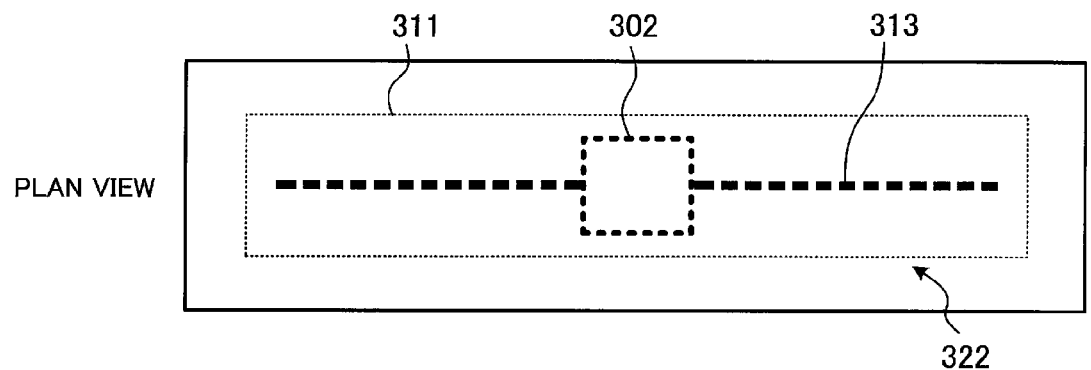
Figure 20B:
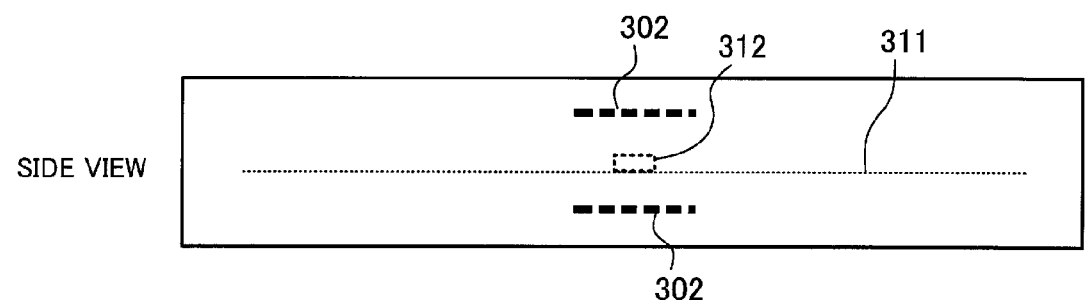
Figure 21:
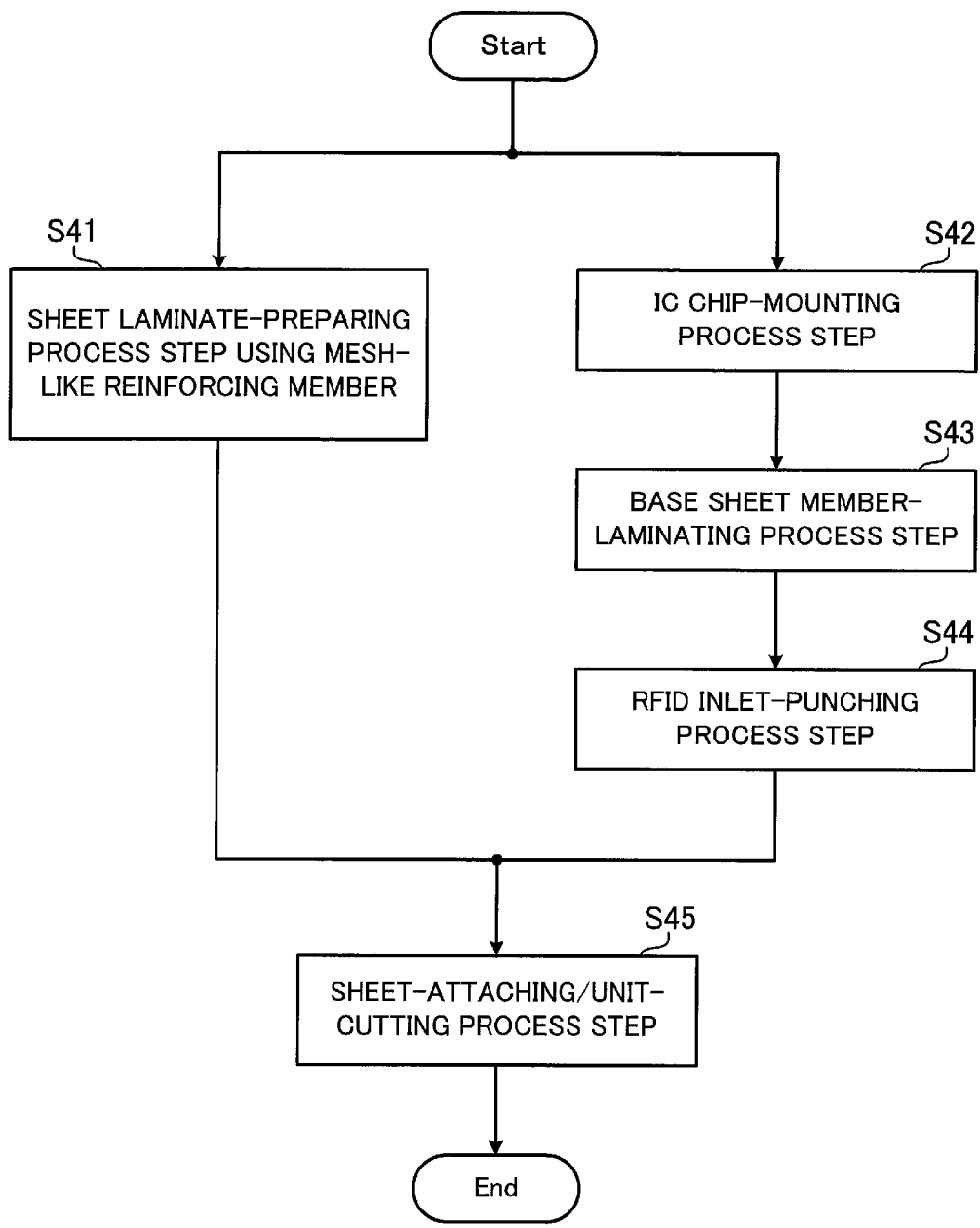
Figure 22:
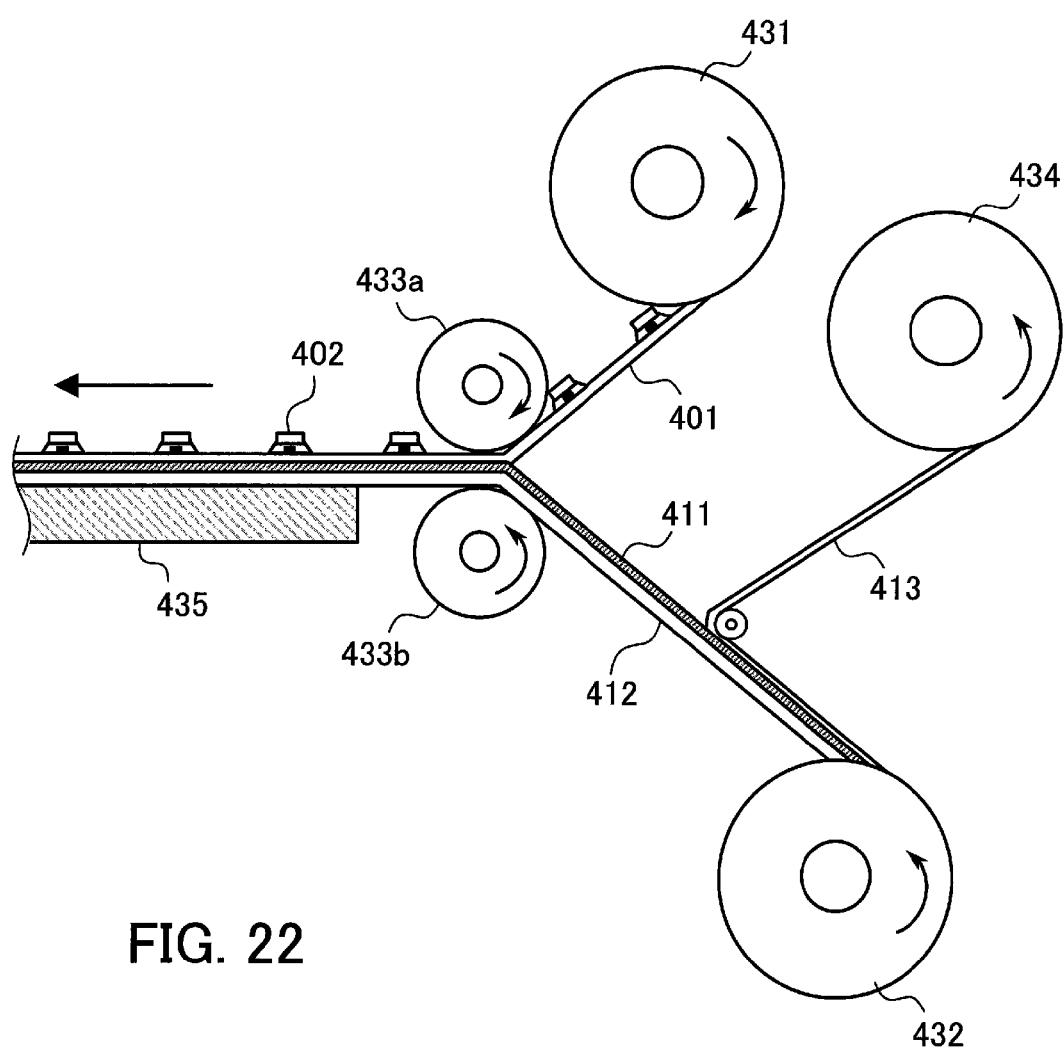
Figure 23A:
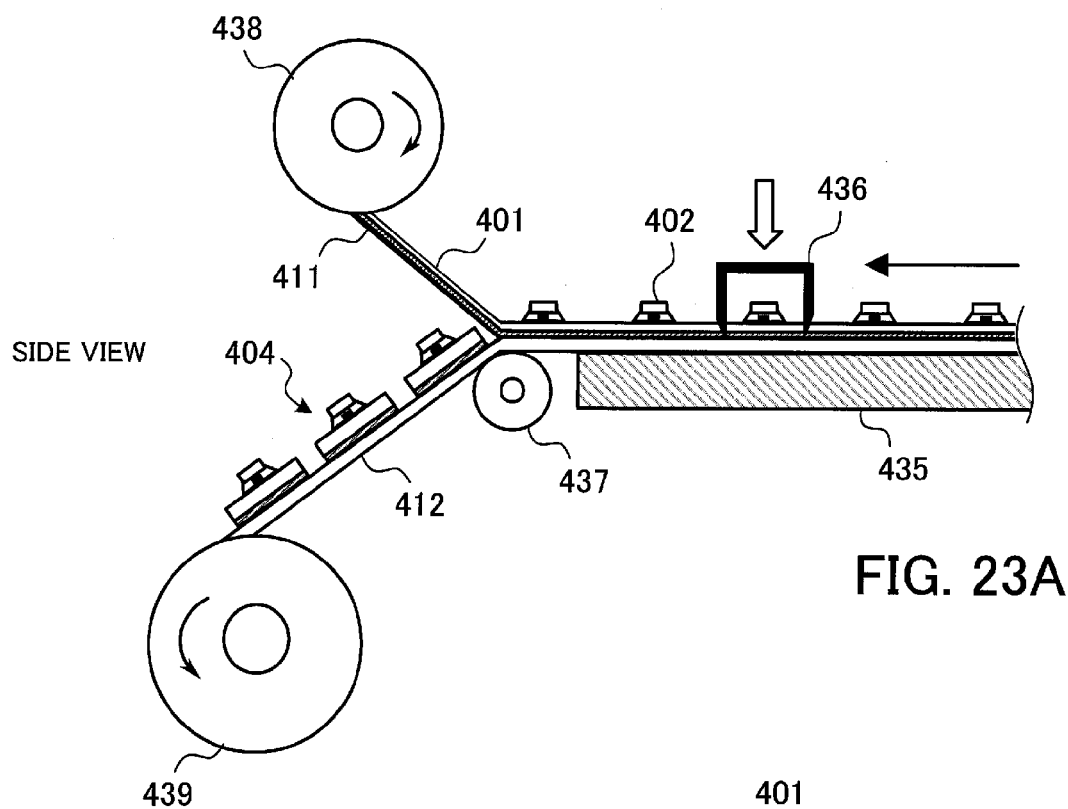
Figure 23B:
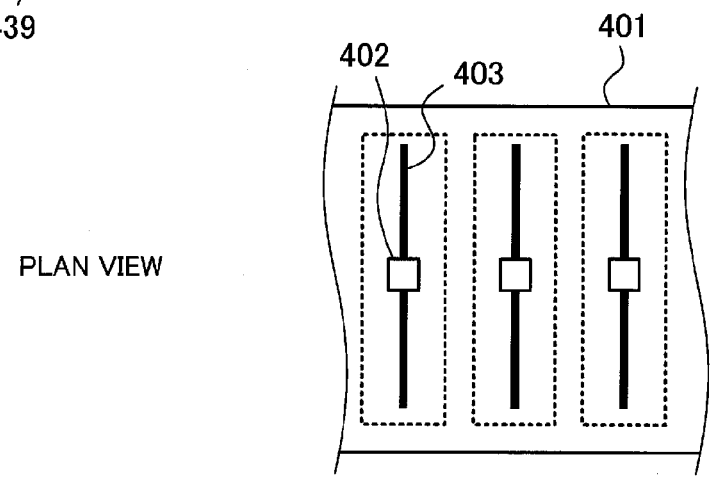
Figure 25A:
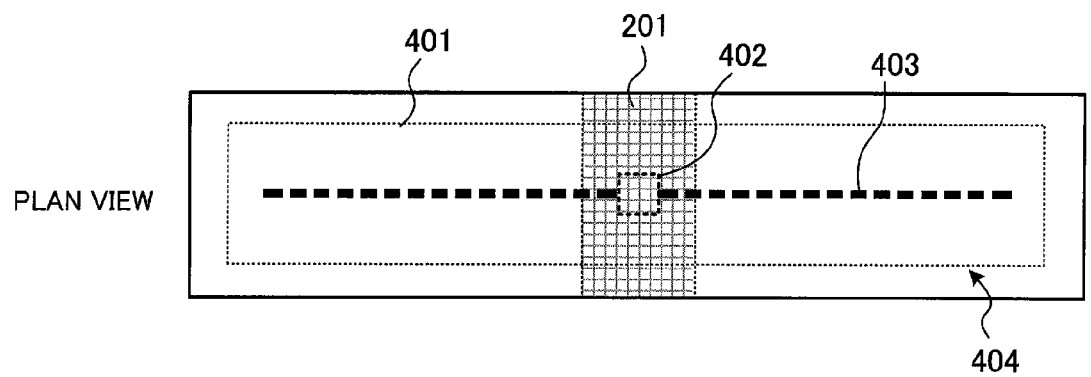
Figure 25B:
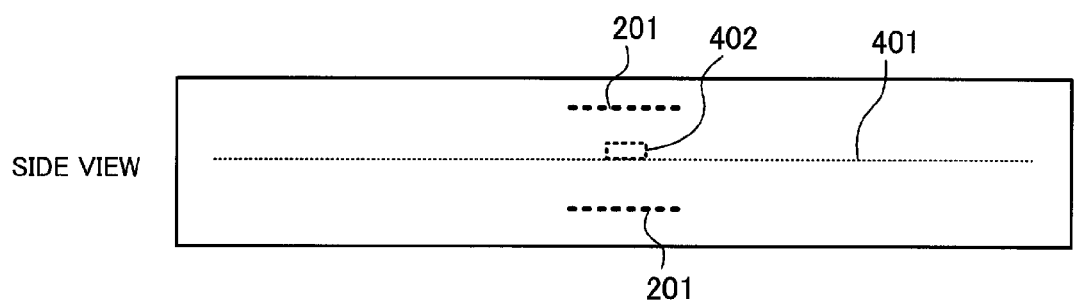
Figure 26:
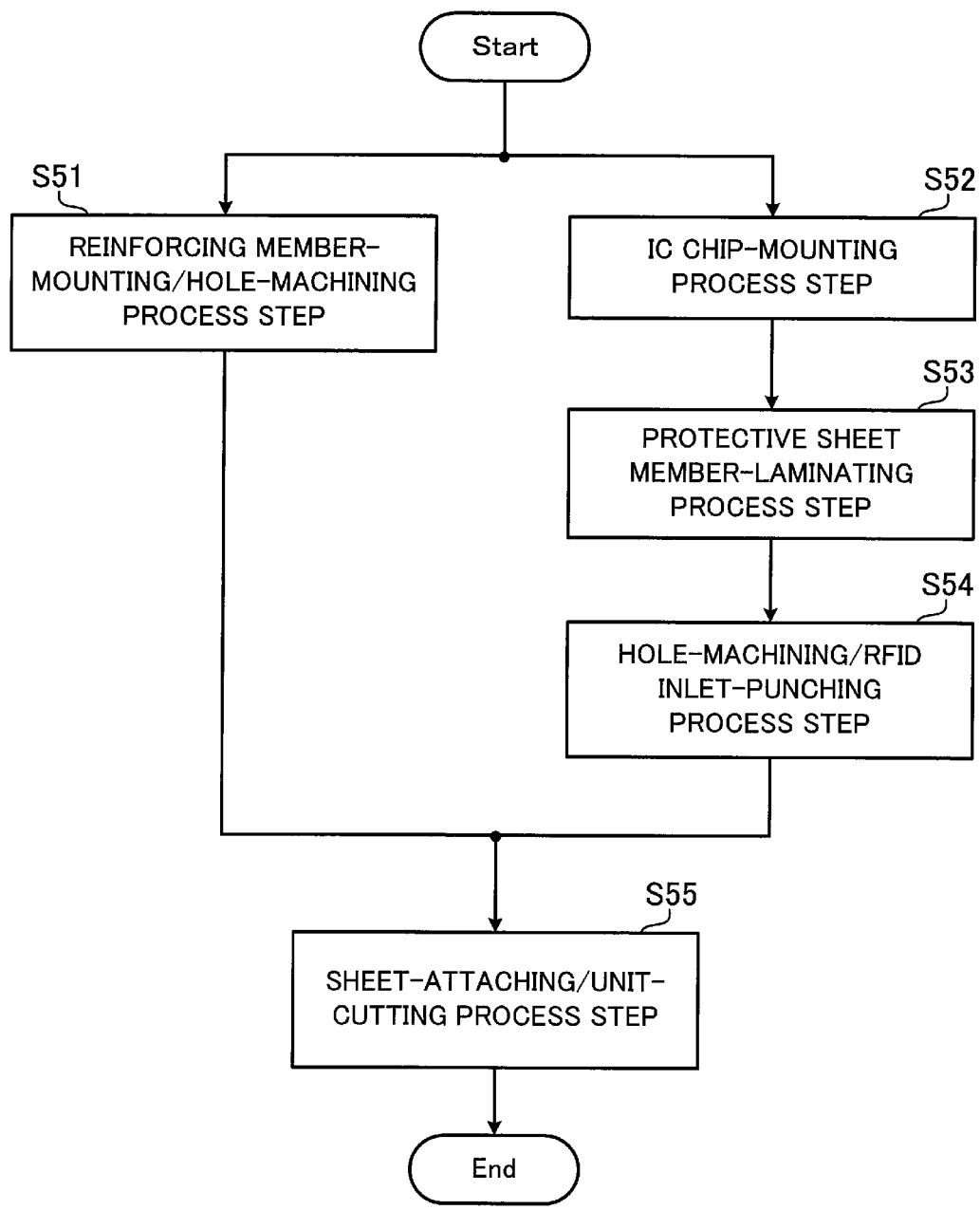
Figure 27A:
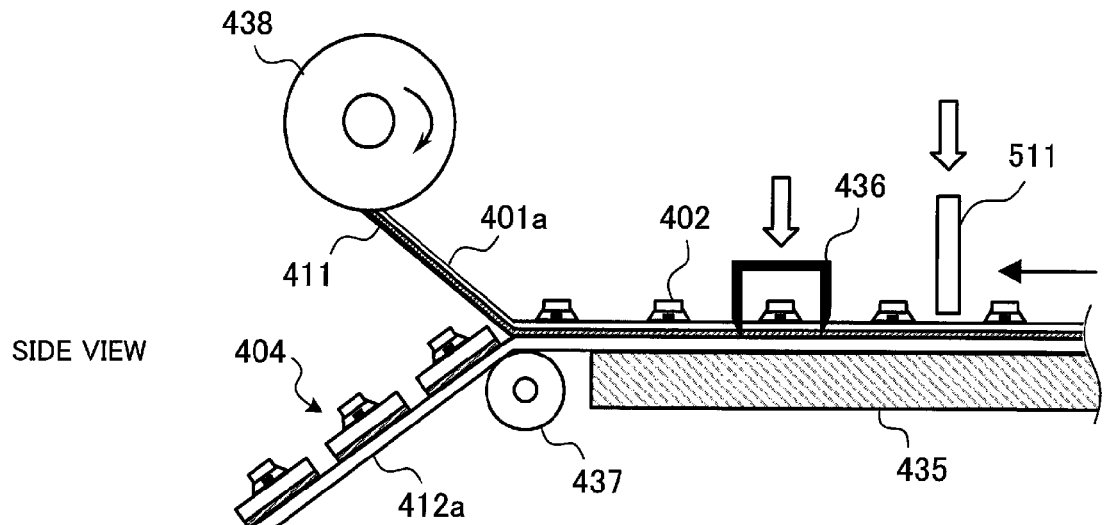
Figure 27B:
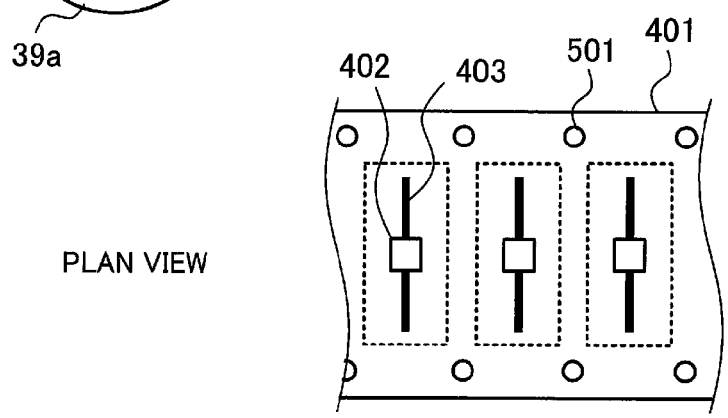

FIGS. 8A and 8B explain a final product-cutting process step in the general RFID tag-manufacturing process;

FIG. 9 is a flowchart illustrating the outline of a process for manufacturing an RFID unit according to a second embodiment;

FIGS. 10A and 10B explain a sheet laminate-preparing process step according to the second embodiment;

FIGS. 11A and 11B explain a slit-forming process step according to the second embodiment;

FIGS. 12A and 12B explain a sheet-attaching/unit-cutting process step according to the second embodiment;

FIGS. 13A and 13B illustrate the RFID unit made in the second embodiment;

FIGS. 14A and 14B explain the reinforcing effects of a nylon mesh;

FIG. 15 is a flowchart illustrating the outline of a process for manufacturing an RFID unit according to a third embodiment;

FIGS. 16A and 16B explain a reinforcing member-mounting/hole-machining process step;

FIGS. 17A and 17B explain an RFID inlet-preparing process step;

FIGS. 18A and 18B explain an RFID inlet-mounting/hole-machining process step;

FIGS. 19A and 19B explain a sheet-attaching/unit-cutting process step;

FIGS. 20A and 20B illustrate an RFID unit prepared according to the third embodiment;

FIG. 21 is a flowchart illustrating the outline of a process for manufacturing an RFID unit according to a fourth embodiment;

FIG. 22 explains a base sheet member-laminating process step;

FIGS. 23A and 23B explain an RFID inlet-punching process step;

FIGS. 24A and 24B explain a sheet-attaching/unit-cutting process step;

FIGS. 25A and 25B illustrate the RFID unit prepared according to the fourth embodiment;

FIG. 26 is a flowchart illustrating the outline of an RFID unit-manufacturing process according to a fifth embodiment;

FIGS. 27A and 27B explain a hole-machining/RFID inlet-punching process step;

FIGS. 28A and 28B explain a sheet-attaching/unit-cutting process step; and

Figure 29A:
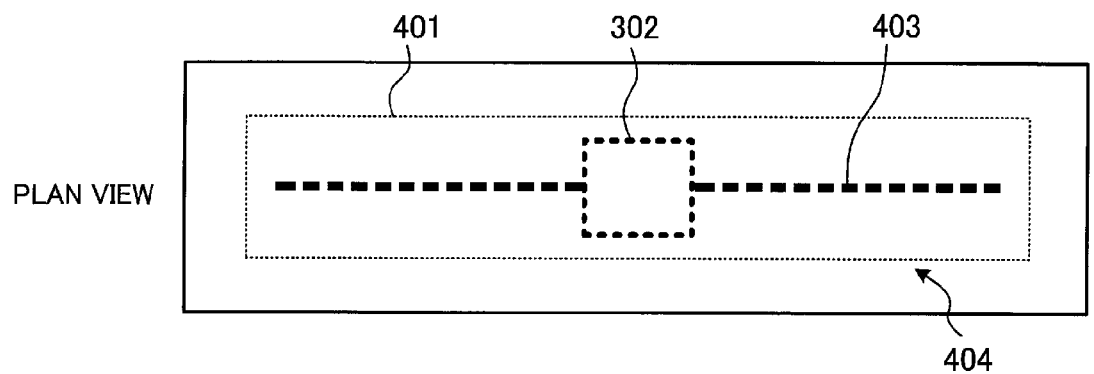
Figure 29B:
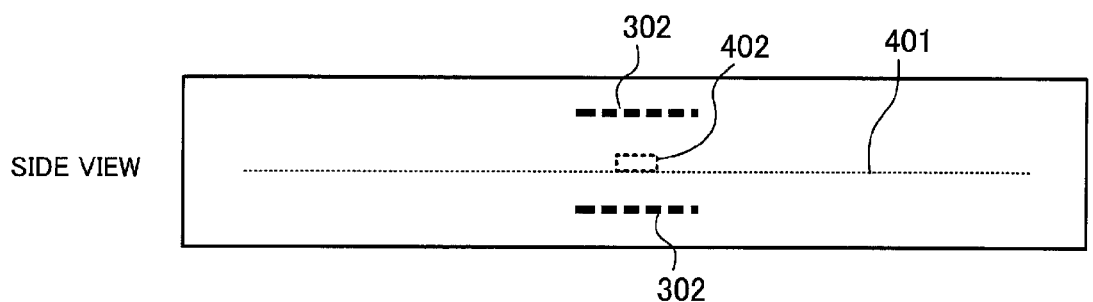

FIGS. 29A and 29B illustrate the RFID unit prepared according to the fifth embodiment.

DESCRIPTION OF EMBODIMENT(S)

Embodiments of the present invention will be explained below with reference to the accompanying drawings, wherein like reference numerals refer to like elements throughout.

In the following embodiments, a noncontact IC chip has e.g. the functions of generating driving power based on electric waves or electromagnetic waves from an external device, communicating with the external device, and transmitting information stored in a storage circuit provided in the noncontact IC chip to the external device. Further, the IC chip may be one which is capable of storing information transmitted from an external device in an internal storage circuit thereof or one which is capable of carrying out various processes, such as an authentication process between the same and the external device, using received information and stored information.

Figure 1:
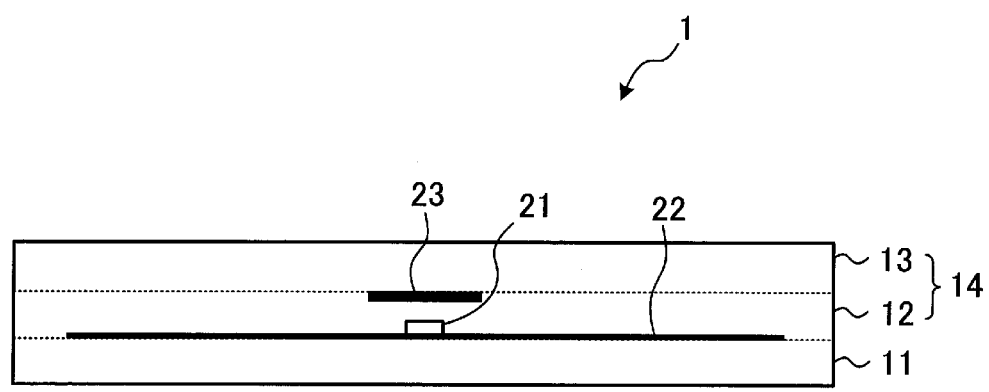

FIG. 1 is a cross-sectional view of an RFID tag according to a first embodiment.

The RFID tag illustrated in FIG. 1 is realized in a state in which a circuit component that serves as an RFID tag is sealed with seat members. In the following description, the RFID tag is referred to as the "RFID unit".

Referring to FIG. 1, the RFID unit 1 comprises three sheet members 11 to 13, which are laminated one upon another. Although a resin material, elastomer, or the like is used as a material for the above sheet members 11 to 13, for example, it is desirable that at least one of the sheet member 12 and the sheet member 13 has elastic properties.

A unit base substrate 22 having a noncontact IC chip 21 mounted thereon is disposed between the sheet member 11 and the sheet member 12. The unit base substrate 22 is formed with a conductor pattern (not shown) serving as an antenna, and the IC chip 21 is connected to the conductor pattern. Here, the sheet members 11 and 12 have a larger area than that of the unit base substrate 22, and are brought into contact with each other in regions surrounding the unit base substrate 22, and fixedly attached to each other. With this configuration, the IC chip 21 and the conductor pattern are sealed with the sheet members 11 and 12. Therefore, even when a liquid or a chemical is attached to the RFID unit 1, it is possible to positively protect the IC chip 21 and the conductor pattern.

Further, the sheet members 12 and 13 form an upper sheet member 14 which is laminated on the sheet member 11, and a reinforcing member 23 for reinforcing the IC chip 21 is disposed between the sheet members 12 and 13 at a location corresponding to the IC chip 21. In the example illustrated in FIG. 1, the reinforcing member 23 is completely sealed with the sheet members 12 and 13. With this configuration, when an external force, such as a bending force, is applied to the RFID unit 1, it is possible to prevent the IC chip 21 from being broken. In the case of this configuration, a hard material, such as a resin material, a ceramic material, or a metal material, is used as the reinforcing member 23.

Figure 2:
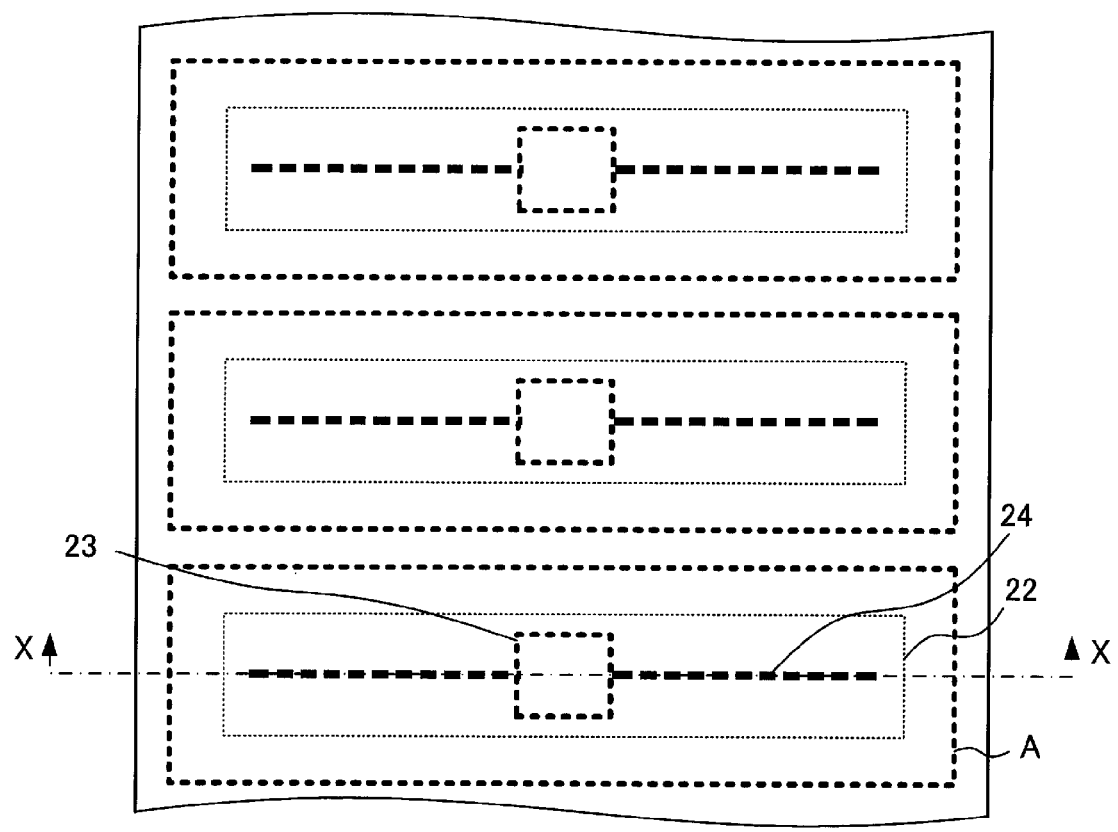

FIG. 2 explains a method of manufacturing the RFID tag according to the first embodiment.

FIG. 2 is a plan view illustrating part of a process for manufacturing the RFID tag in the present embodiment. In the present embodiment, belt-like sheet materials corresponding to the respective sheet members 11 to 13 are laminated one upon another, and a plurality of circuit components, such as IC chips 21, each of which forms an RFID tag, are arranged in parallel between the sheet materials. Then, after the sheet materials are laminated and fixedly attached to each other, predetermined regions of the resulting laminate are cut out. By carrying out such process steps, a large number of RFID units 1 are efficiently manufactured. FIG. 1 corresponds to a cross-sectional view of a cut-out region "A" taken on line X-X of FIG. 2.

A process for manufacturing the RFID unit 1 is roughly classified into a first process step for fixedly attaching the unit base substrate 22 having the IC chip 21 mounted thereon to the sheet member 11, a second process step for laminating the upper sheet member 14 on the sheet member 11 to fixedly attach the sheet members 11 and 14 to each other, and a third process step for cutting out respective regions of RFID tags from the sheet member laminate.

In the first process step, the belt-like sheet material corresponding to the sheet member 11 is provided e.g. in a state wound up around a roll. Then, the unit base substrates 22 having the respective IC chips 21 mounted thereon are fixedly attached to the belt-like sheet material side by side along the direction of the length thereof. The belt-like sheet material having the unit base substrates 22 fixedly attached thereto can be taken up by a roll.

In the second process step, the belt-like sheet materials corresponding to the respective sheet members 12 and 13 are provided e.g. in a state wound up around rolls. Here, the reinforcing members 23 are fixedly attached to one of the sheet members 12 and 13 at the same intervals as the intervals at which the unit base substrates 22 are arranged. Then, the above-described belt-like sheet materials corresponding to the sheet members 11 to 13 are sequentially pulled out from the rolls, for being laminated one upon another, and adjacent ones of the belt-like sheet materials are fixedly attached to each other e.g. by thermocompression bonding. At this time, the belt-like sheet materials are placed in the state illustrated in FIG. 2.

In the third process step, each cut-out region "A" corresponding to one RFID tag is cut out from the laminate formed by laminating the belt-like sheet materials one upon another in the second process step, using e.g. a punching die. This manufactures the RFID units 1.

According to the above-mentioned manufacturing process, the unit base substrates 22 each having the IC chip 21 and the conductor pattern 24 mounted thereon are fixedly attached in advance to the belt-like sheet material corresponding to the sheet member 11, and the reinforcing members 23 are arranged in advance between the belt-like sheet materials corresponding to the respective sheet members 12 and 13, whereafter these belt-like sheet materials are subjected to the above-mentioned second process step.

More specifically, conventionally, a protective sheet has to be laminated onto a sheet-like substrate in a state where both IC chips 21 and reinforcing members 23 are mounted thereon, and hence the bending resistances of the IC chips 21 and the reinforcing members 23 make it impossible to roll up the sheet-like substrate in advance. In contrast, according to the present embodiment, while the IC chips 21 are mounted on a belt-like sheet corresponding to the sheet member 11, the reinforcing members 23 are disposed between belt-like sheets corresponding to the sheet members 12 and 13. That is, a set of IC chips 21 and a set of reinforcing members 23 can be arranged separately in respective different belt-like sheets. As a consequence, the bending resistances of the respective sheet members become lower than when both the IC chip 21 and the reinforcing member 23 are mounted on the sheet-like substrate, whereby it is possible to roll up the belt-like sheets around a roll.

Then, after the above sheet members have been laminated one upon another, a final form of RFID tags before being cut out is completed. Therefore, if a final product is cut out in this state, it becomes unnecessary to roll up the belt-like sheets around a roll, in the state in which both the IC chip 21 and the reinforcing member 23 are mounted.

Thus, it is possible to employ the manufacturing method in which all the belt-like sheet materials to be laminated are rolled around rolls, and are sequentially pulled out from the rolls, for being laminated one upon another. This makes it possible to efficiently manufacture a large number of RFID units 1.

As a method of manufacturing the unit base substrates 22, it is possible to employ e.g. a method of preparing a belt-like base substrate which has a large number of conductor patterns 24 arranged side by side in a longitudinal direction, mounting the IC chips 21 on the respective conductor patterns 24, and then cutting the respective regions of the unit base substrates 22 off the belt-like base substrate.

Further, as a method different from the above method, it is also possible to employ a method of directly manufacturing a belt-like sheet material corresponding to the sheet member 11 and having a large number of unit base substrates 22 arranged thereon in the direction of the length thereof, without cutting off the individual unit base substrates 22. More specifically, first, a belt-like sheet material having an adhesive agent attached to one surface thereof is affixed to a belt-like base substrate corresponding to the unit base substrates 22. At this time, the belt-like sheet material is affixed to a surface of the belt-like base substrate, opposite to a surface thereof on which the IC chips 21 are mounted. Next, peripheral edges of regions of the belt-like base substrate, each including one IC chip 21 and the conductor pattern 24 connected thereto, is cut through together with a layer of the adhesive agent. At this time, the belt-like sheet material corresponding to the sheet member 11 is not cut through. Then, only an outer portion of the belt-like base substrate surrounding the cut-off regions thereof is removed from the belt-like sheet material. As a consequence, only the respective regions of the unit base substrates 22 are left behind on the belt-like sheet material.

If the above method is employed, after the sheet-like substrate having a large number of unit base substrates 22 affixed thereto is once taken up by a roll, it is possible submit the belt-like sheet material to the above-described lamination process step, thereby making it possible to further enhance manufacturing efficiency.

Although in the examples illustrated in FIGS. 1 and 2, the reinforcing member 23 is disposed only above the IC chip 21, it is possible to dispose the same reinforcing member also below the IC chip 21. In this case, it suffices that with a reinforcing member attached to a lower surface of the sheet member 11, another sheet member is laminated thereon in a manner sandwiching the reinforcing member, and is fixedly attached to the sheet member 11. In this case, however, at least one of the sheet member 11 and the sheet member provided thereunder is formed in advance using an elastic material.

Further, although in the examples illustrated in FIGS. 1 and 2, the reinforcing members 23 are separately arranged for reinforcing the individual IC chips 21, respectively, mesh-like reinforcing members may be used in place of the above reinforcing members 23. In this case, between belt-like sheet materials corresponding to the sheet members 12 and 13, each belt-like reinforcing member in a mesh extending in the direction of the length of the sheet members 12 and 13 is sandwiched in advance. Then, after the belt-like sheet materials are laminated and fixedly attached by the same method as described above, regions corresponding to the RFID units 1 are cut out. According to this method, it is possible to further enhance the efficiency of the process step for arranging the reinforcing members.

Further, as described hereinafter, when the mesh-like reinforcing members are used, a method may be employed which omits the process step for fixedly attaching the unit base substrates 22 in advance to the belt-like sheet material corresponding to the sheet member 11. In this case, openings are formed in advance through the belt-like base substrate having the conductor patterns 24 formed side by side thereon, and after the IC chips 21 are connected to the respective conductor patterns 24, laminating members each including the two layers of the belt-like sheet materials which sandwich the mesh-like reinforcing member are laminated on the respective opposite surfaces of the belt-like base substrate, whereafter the laminating members are fixedly attached to each other via the openings.

Next, a more detailed description will be given of an embodiment of the method of manufacturing the RFID tag. In the following description, first, to facilitate comparison between the method of manufacturing the RFID tag according to the embodiments and the prior art, an example of a general process for manufacturing the RFID tag will be described with reference to FIGS. 3A and 3B to FIGS. 8A and 8B. Then, examples of the RFID tag-manufacturing process which solve the problems of the general RFID tag-manufacturing process will be described as second to fifth embodiments.

[General RFID Tag-Manufacturing Process]

FIGS. 3A and 3B to FIGS. 8A and 8B explain a process step for mounting IC chips in the general RFID tag-manufacturing process. FIG. 3A is a side view illustrating how this process step is carried out, and FIG. 3B is a plan view illustrating the same.

Referring to FIGS. 3A and 3B, an antenna substrate 101 is a sheet-like or film-like substrate having a large number of antenna patterns 102 formed at predetermined space intervals. The antenna patterns 102 are formed on a surface of the substrate using an electrically conductive material, such as aluminum, e.g. by a printing technique or a thin film-forming technique. In the examples illustrated in FIGS. 3A and 3B, each antenna pattern 102 is linearly formed with a gap at an approximately central portion thereof. Further, as another example of the shape of the antenna pattern 102, there may be mentioned a loop-like or spiral-like shape.

In a process step for mounting noncontact IC chips 103, the antenna substrate 101 formed with the antenna patterns 102, as described above, is provided in a state wound around a roll 121. By rotating the roll 121, the antenna substrate 101 is sequentially pulled out onto a stage 122, and the IC chips 103 are sequentially mounted to the antenna substrate 101 on the stage 122.

The IC chips 103 are mounted e.g. by flip chip bonding using a bonding tool 123. Each IC chip 103 has a lower surface or a side surface formed with two antenna terminals, not illustrated, and these antenna terminals are connected to respective portions of each antenna pattern 102, separated by the gap. The antenna substrate 101 having the IC chips 103 mounted through the above-described process step are taken up by the roll again.

Figure 4:
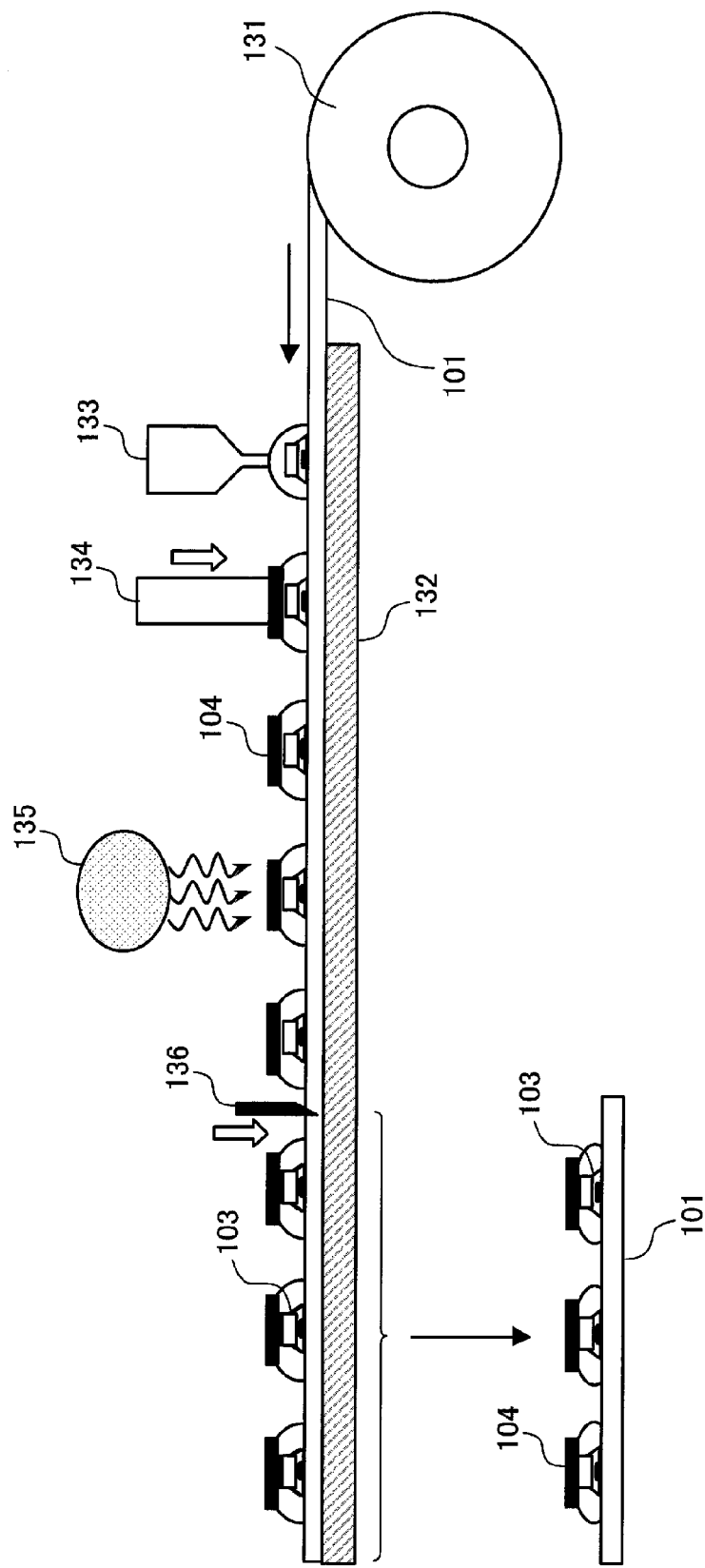

FIG. 4 explains a process step for mounting the reinforcing members on the antenna substrate 101 in the general RFID tag-manufacturing process.

After the IC chips 103 are mounted on the antenna substrate 101, and the antenna substrate 101 is wound around a roll 131, reinforcing members 104 for reinforcing the IC chips 103 are attached to the antenna substrate 101 in the next process step. As the reinforcing member 104, there can be used a resin material, such as FRP (Fiber-reinforced Plastic), a ceramic material or a metal material. In the example illustrated in FIG. 4, the reinforcing member 104 is formed to have a shape of a flat plate.

When the antenna substrate 101 is pulled out from the roll 131 onto a stage 132, first, an adhesive agent is applied to the IC chips 103 on the antenna substrate 101 by a dispenser 133. Next, the reinforcing members 104 are placed on the upper surfaces of the IC chips 103 coated with the adhesive agent, by a bonding tool 134, and further the adhesive agent is cured by heat from a heat source 135.

When the reinforcing members 104 are fixedly attached to upper portions of the IC chips 103, as described above, projections formed by the IC chips 103, the adhesive agent and the reinforcing members 104 come to exist on the antenna substrate 101, which makes it difficult to take up the antenna substrate 101 by a roll. To solve the above problem, the antenna substrate 101 is cut by a cutter 136 in units of a single or a plurality of IC chips 103. Then, cut-off parts of the antenna substrate 101 are conveyed to a device used in the next process step. In the example illustrated in FIG. 4, the antenna substrate 101 is cut into units of regions each with three IC chips 103 mounted thereon.

Figure 5A:
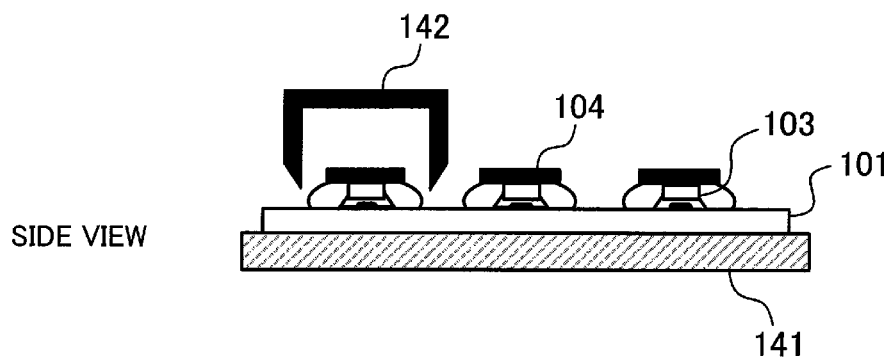
Figure 5B:
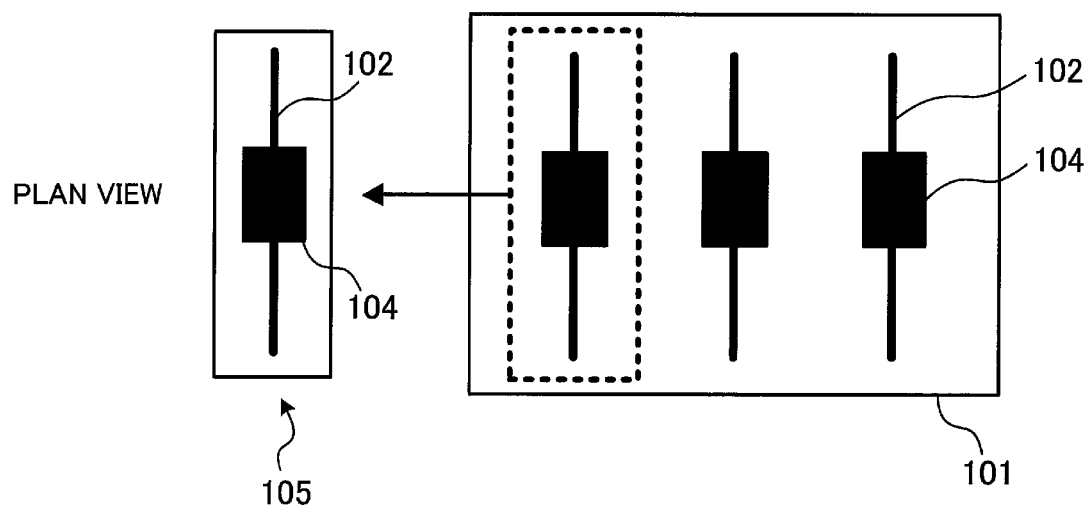

FIGS. 5A and 5B explain a process step for cutting out RFID inlets in the general RFID tag-manufacturing process. FIG. 5A is a side view illustrating how this process step is carried out, and FIG. 5B is a plan view illustrating the same.

After being placed on a stage 141, the antenna substrate 101 cut as described above is punched by a punching die 142 along dotted lines in FIG. 5B, whereby a group of electronic components constituting an RFID tag are packaged whereby an RFID inlet 105 is formed.

Figure 6A:
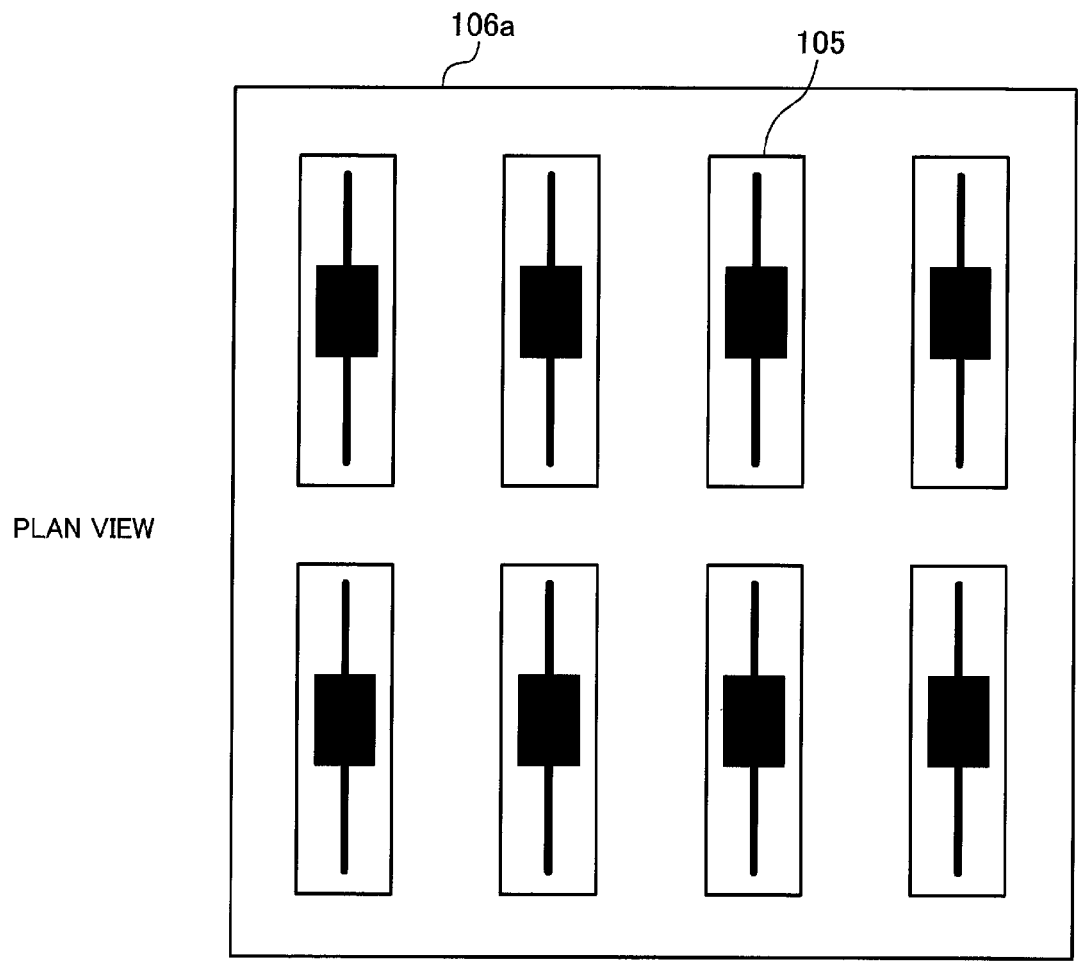
FIGS. 6A and 6B are first diagrams which are useful in explaining an RFID inlet-sealing process step in the general RFID tag-manufacturing process.
Figure 6B:
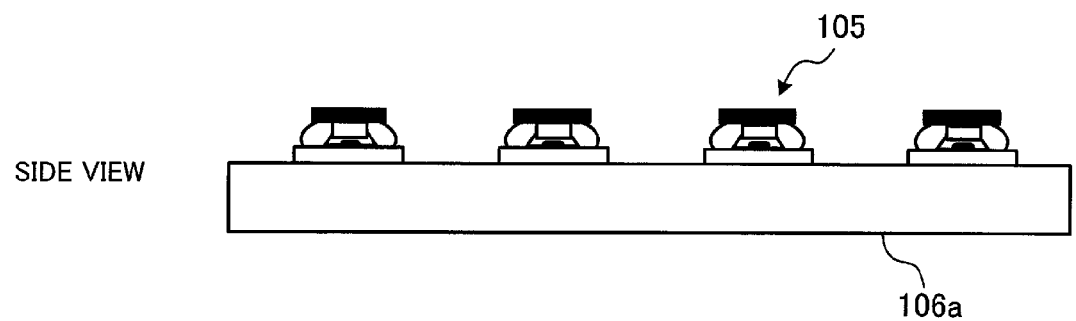
Figure 7:
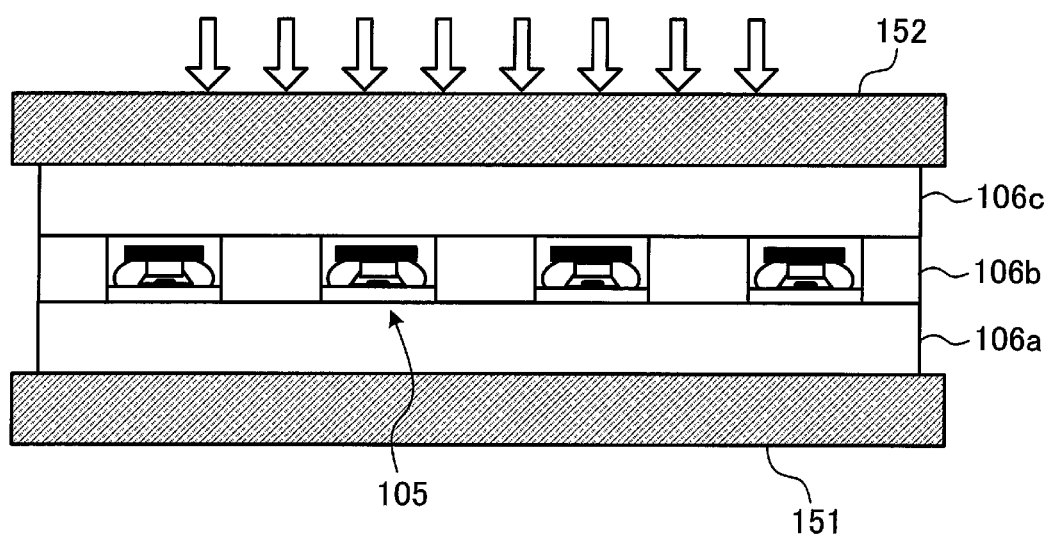
FIG. 7 is a second diagram which is useful in explaining the RFID inlet-sealing process step in the general RFID tag-manufacturing process.

FIGS. 6A and 6B and FIG. 7 explain an RFID inlet-sealing process step in the general RFID tag-manufacturing process.

First, as illustrated in FIGS. 6A and 6B, a plurality of RFID inlets 105 manufactured in the above-described process step are placed side by side on a lower protective sheet 106a as a lower packaging material. A resin material, such as PET (Polyethylene Terephthalate), EPDM (Ethylene Propylene Diene Terpolymer) or silicone rubber is used as a material for the lower protective sheet 106a. FIG. 6A is a plan view illustrating how eight RFID inlets 105 are arranged side by side, by way of example, and FIG. 6B is a side view illustrating the same.

Next, as illustrated in FIG. 7, on a table 151, an intermediate protective sheet 106b and an upper protective sheet 106c are further placed on an upper surface of the lower protective sheet 106a having the RFID inlets 105 placed thereon. The intermediate protective sheet 106b has a thickness equal to or larger than the thickness of the RFID inlet 105, and is configured such that regions corresponding to respective locations of the RFID inlets 105 are hollowed.

Next, the above-mentioned protective sheets are pressurized by a press head 152 from above the upper protective sheet 106c downward, and are heated. Here, when the lower protective sheet 106a, the intermediate protective sheet 106b, and the upper protective sheet 106c are made of the above-mentioned resin material, the protective sheets are fixedly attached to each other by being pressurized and heated, whereby the RFID inlets 105 are sealed.

FIGS. 8A and 8B explain a final product-cutting process step for cutting out a final product, in the general RFID tag-manufacturing process. FIG. 8A is a side view illustrating how this process step is carried out, and FIG. 8B is a plan view illustrating the same.

In FIGS. 8A and 8B, a protective sheet 106 indicates a region in a state in which the lower protective sheet 106a, the intermediate protective sheet 106b and the upper protective sheet 106c, described above, are fixedly attached to each other. In the process step illustrated in FIGS. 8A and 8B, regions each including one RFID inlet 105 are punched out by a punching die 161, whereby RFID units 107, which are final products, are manufactured.

Through the above-described process steps illustrated in FIGS. 3A and 3B to FIGS. 8A and 8B, there are manufactured the RFID units 107 in each of which the whole of the RFID inlet 105 having the IC chip 103 and the antenna pattern 102 reinforced by the reinforcing member 104 mounted thereon is sealed with the protective sheet 106. The RFID unit 107 is resistant to external forces, such as a bending force and a pressing force, and at the same time even when the RFID unit 107 is placed in a liquid or a chemical, the inside of the RFID unit 107 is prevented from being corroded.

However, in the above general manufacturing method, after the process step for mounting the IC chips 103 and the reinforcing members 104 on the antenna substrate 101, it becomes difficult to take up the antenna substrate 101 by a roll, and hence it is necessary to proceed to the remaining process steps after the RFID inlets 105 are cut out from the antenna substrate 101. Although the method of manufacturing the RFID tag using rolls is very efficient since a continuous antenna substrate can be easily carried and be sequentially pulled out from a roll for continuously mounting component parts thereon, the above-mentioned manufacturing method suffers from the problem that the method of manufacturing the RFID tag using rolls can be applied only up to an intermediate process step, which degrades manufacturing efficiency.

Further, in the process step for sealing the cut-out RFID inlets 105, to make flat the upper surface of the protective sheet 106, it is necessary to use the intermediate protective sheet 106b having a shape matching the respective locations of the RFID inlets 105. Therefore, in the process step for sealing the RFID inlets 105, it is necessary to convey the cut-out RFID inlets 105 to respective predetermined locations for accurately positioning the same. This makes the process step complicated.

In the embodiments of the present invention, it is an object to manufacture products having approximately the same specifications as those of the above-mentioned RFID unit 107, from start to finish, by the manufacturing method using rolls, thereby making it possible to manufacture a large number of products at low costs.

Although in the embodiments of the present invention, the antenna pattern is linearly formed, it is possible to use an antenna pattern having a loop-like or spiral-like shape.

Second Embodiment

FIG. 9 is a flowchart illustrating the outline of a process for manufacturing RFID units according to a second embodiment.

[Step S21] In the second embodiment, a mesh-like sheet material is used as an IC chip-reinforcing member. First, a sheet laminate is prepared by sandwiching a mesh-like reinforcing member by elastic protective members. The prepared sheet laminate is rolled up around rolls.

[Step S22] On the other hand, an antenna substrate formed with an antenna pattern is prepared by the same method as used in the above-described general RFID tag-manufacturing process. The prepared antenna substrate is taken up by a roll.

[Step S23] IC chips are mounted on the antenna substrate by the same method as used in the above-described general RFID tag-manufacturing process. The antenna substrate having the IC chips mounted thereon can also be taken up by a roll.

[Step S24] Slits are formed in respective predetermined locations of the antenna substrate having the IC chips mounted thereon. The antenna substrate formed with the slits is taken up by a roll.

[Step S25] The antenna substrate having the slits formed in the step S24 is sandwiched from opposite sides by the sheet laminates prepared in the step S21, and the sheet laminates are fixedly attached to each other. Further, the member formed by fixedly attaching the sheet laminates is cut out in units of regions of respective RFID tags to thereby complete RFID units. In this process step, by pulling out the antenna substrate and the sheet laminates from the respective rolls thereof at the same speed, it is possible to fixedly attach the sheet laminates to each other and further cut out the RFID units.

Next, a more detailed description will be given of the above-mentioned process steps.

FIGS. 10A and 10B explain a sheet laminate-preparing process step according to the second embodiment. FIG. 10A is a side view illustrating how this process step is carried out, and FIG. 10B is a plan view illustrating the same.

The process step illustrated in FIGS. 10A and 10B corresponds to the step S21 in FIG. 9. In this process step, a sheet-like nylon mesh 201 and rubber sheets 202a and 202b are provided in states wound around rolls 221, 222a and 222b, respectively, and a sheet laminate is prepared by laminating the sheet-like nylon mesh 201 and the rubber sheets 202a and 202b.

Here, the nylon mesh 201 is used as a reinforcing member for noncontact IC chips, and has a width at least large enough to cover the whole of each IC chip. The material for the reinforcing member is not limited to nylon but any of resin materials and metal materials, including metal nets, may be used as the material for the reinforcing member insofar as it is in the form of a mesh. However, it is desirable that the material has a certain degree of rigidity, and is difficult to extend and at the same time bendable to a certain degree. Further, to maintain an excellent communication performance of the IC chips, it is desirable that the material is non-conductive.

On the other hand, as described hereinafter, the rubber sheets 202a and 202b are sheet members in contact with the IC chips or a substrate on which the IC chips are mounted, and are provided for protecting the IC chips or the substrate. Although the material for the protective sheet members may be a resin material or one of other materials, such as elastomer, it is desirable that when the IC chips are pressed against the material, the material has elastic properties large enough for the IC chips to sink. Further, as described hereinafter, it is desirable that the material can be thermocompression-bonded.

The nylon mesh 201 and the rubber sheets 202a and 202b are pulled in between rollers 223a and 223b from the rolls 221, 222a and 222b, and are laminated one upon another. At this time, the nylon mesh 201 is vertically sandwiched between the rubber sheets 202a and 202b, and the resulting laminate is taken up by a roll 224.

In the above process step, it is not particularly necessary to attach the nylon mesh 201 to the laminated rubber sheets 202a and 202b. However, for example, the opposite surfaces of the nylon mesh 201, or respective surfaces of the rubber sheets 202a and 202b, opposed to the nylon mesh 201, are coated with an adhesive agent such that the opposed surfaces thereof are attached to each other.

FIGS. 11A and 11B explain a slit-forming process step according to the second embodiment. FIG. 11A is a side view illustrating how this process step is carried out, and FIG. 11B is a plan view illustrating the same.

As described above in the step S22 in FIG. 9, the antenna substrate formed with the antenna pattern is prepared, separately from the sheet laminate. Next, as described above in the step S23 in FIG. 9, the IC chips are mounted on the prepared antenna substrate. This process step is the same as the IC chip-mounting process step in the general RFID tag-manufacturing process, described above with reference to FIGS. 3A and 3B, and illustration thereof is omitted. It is assumed here that an antenna substrate 203, antenna patterns 204 and IC chips 205 illustrated in FIGS. 11A and 11B correspond to the antenna substrate 101, the antenna patterns 102 and the IC chips 103 illustrated in FIGS. 11A and 11B, respectively.

The antenna substrate 203 having the IC chips 205 mounted thereon is once taken up e.g. by a roll 231, and then is subjected to the slit-forming process step illustrated in FIGS. 11A and 11B. Now, the size of the IC chips 205 is small e.g. with respect to the width of the antenna substrate 203, and further the height thereof is low with respect to the height of e.g. the above-described reinforcing members 104, so that the antenna substrate 203 having only the IC chips 205 mounted thereon can be relatively easily wound around the roll 231.

Next, slits are formed in the antenna substrate 203 using a punching die 233 while the roll 231 is rotated to sequentially pull out the antenna substrate 203 onto a stage 232. In the examples illustrated in FIGS. 11A and 11B, slits 203a are formed in regions between the antenna patterns 204 arranged in parallel with each other, and slits 203b are formed in regions on the opposite longitudinal ends of each antenna pattern 204.

These slits are formed to bring rubber sheets on opposite ends of the antenna substrate 203 into contact with each other and cause them to be fixedly attached to each other by thermocompression bonding in a sheet-attaching process step, described hereinafter. Therefore, the size of the slits and locations for forming the slits are determined such that a sufficient attaching force is caused by thermocompression bonding. Further, basically, the regions for forming the slits are not limited insofar as they do not include the IC chips 205 and the antenna patterns 204. However, as described hereinafter, the size of a portion of the antenna substrate 203, exposed from a side surface of a completed RFID unit can be reduced depending on the locations where the slits are formed and the size of the slits.

The antenna substrate 203 formed with the slits are taken up by a roll again. As this roll, there may be used the original roll 231 around which the antenna substrate 203 has been wound, or another roll provided toward the other end of the antenna substrate 203.

The formation of the slits as described above may be performed in the step S23 immediately before or immediately after the IC chips 205 are mounted on the antenna substrate 203. Alternatively, in the step S21, the slits may be formed in advance in the antenna substrate 203 provided for forming the antenna patterns 102.

FIGS. 12A and 12B explain a sheet-attaching/unit-cutting process step according to the second embodiment. FIG. 12A is a side view illustrating how this process step is carried out, and FIG. 12B is a plan view illustrating the same.

The process step illustrated in FIGS. 12A and 12B corresponds to the step S25 in FIG. 9. In this process step, first, sheet laminates 206a and 206b formed in the step S21, respectively, are arranged on opposite surfaces of the antenna substrate 203 having the slits formed in the step S24. Referring to FIGS. 12A and 12B, the antenna substrate 203 and the sheet laminates 206a and 206b are pulled out from rolls 241, 242a and 242b, respectively, and are conveyed while being vertically pressurized by rollers 243a and 243b. In accordance therewith, heat is applied e.g. by the rollers 243a and 243b, or from a heat source, not illustrated, other than the rollers 243a and 243b.

Thus, a rubber sheet as a lower layer of the sheet laminate 206a, i.e. on a side opposed to the antenna substrate 203 and a rubber sheet as an upper layer of the sheet laminate 206b are thermocompression-bonded to each other via the slits formed in the antenna substrate 203, whereby the IC chips 205 and the antenna patterns 204 are sealed with the rubber sheets.

Further, a rubber sheet as an upper layer of the sheet laminate 206a and the rubber sheet as the lower layer of the sheet laminate 206a are thermocompression-bonded to each other via gaps of the nylon mesh 201 between the rubber sheets. Similarly, the rubber sheet as the upper layer of the sheet laminate 206b and a rubber sheet as a lower layer of the sheet laminate 206b are thermocompression-bonded to each other via gaps of the nylon mesh 201 between the rubber sheets.

Now, the rubber sheet as the lower layer of the sheet laminate 206a has elastic properties, so that when press-fitted into the antenna substrate 203, the rubber sheet is contracted only by the height of the IC chip 205. This holds the upper surface of the sheet laminate 206a approximately flat. To make flat the upper surface of the sheet laminate 206a, recesses may be formed in advance in the rubber sheet e.g. according to the shape of the IC chip 205. However, in this case, in the process step for fixedly attaching the sheet laminates 206a and 206b that have the antenna substrate 203 therebetween, it is possible to position the recesses on the sheet laminate 206a to the locations of the IC chips 205.

The sheet members thermocompression-bonded to each other as described above are cut out by a punching die 244 in units of regions each including one IC chip 205 and one antenna pattern 204 connected to the IC chip 205. The units cut out in this process step become RFID units, which are final products. In FIG. 12B, the regions cut out by the punching die 244 are indicated as cut-out regions 207. In the present embodiment, the cut-out regions 207 are configured to pass through the insides of the respective slits 203a and 203b formed in the antenna substrate 203.

In the present embodiment, the sheet laminates 206a and 206b prepared in advance in the step S21 are subjected to the step S25. However, for example, in the step S25, the laminating and fixedly attaching of each of the sheet laminates 206a and 206b may be performed simultaneously with the laminating and fixedly attaching of the sheet laminates 206a and 206b and the antenna substrate 203.

FIGS. 13A and 13B illustrate the RFID unit made in the second embodiment. FIG. 13A is a plan view illustrating the same, and FIG. 13B is a side view illustrating the same.

Referring to FIGS. 13A and 13B, in the RFID unit prepared in the present embodiment, the IC chip 205 and the antenna pattern 204 are sealed with the rubber sheets as protective members. Therefore, even when a liquid or a chemical is attached to the RFID unit, it is possible to cause the IC chip 205 to normally operate while preventing the liquid or the chemical from touching the IC chip 205 and the antenna pattern 204 within the RFID unit.

Further, the layers of the nylon mesh 201 are formed above and below the IC chip 205. Therefore, even when pressure or a bending force is applied to the RFID unit from the outside, the IC chip 205 is protected. The reinforcing effects of the nylon mesh 201 will be described in more detail with reference to FIGS. 14A and 14B.

Further, end faces of the nylon mesh 201 are exposed from side surfaces of the RFID unit. However, since the nylon mesh 201, the IC chip 205 and the antenna substrate 203 are completely separated from each other by the rubber sheets, the operation of the IC chip 205 is not influenced by the exposure of the nylon mesh 201.

In the RFID unit, however, end faces of the antenna substrate 203 are partially exposed from the side surface of the RFID unit. Therefore, it is desirable to determine the locations and size of the slits formed in the antenna substrate 203 before being cut, and the respective locations of regions from which the RFID units are cut out, such that the exposed portion of the antenna substrate 203 is minimized.

In the present embodiment, in the process step for cutting out the RFID units, illustrated in FIGS. 12A and 12B, the cut-out regions 207 are configured to pass through the insides of the respective slits 203a and 203b formed in the antenna substrate 203. As a consequence, the portion of the antenna substrate 203, exposed from the side surface of each RFID unit becomes only a region located between the slit 203a and the slit 203b adjacent to the slit 203a. In FIGS. 13A and 13B, this region is indicated as an exposed region 208.

Therefore, in the present embodiment, in the antenna substrate 203 yet to be cut, it is desirable to maximize the length of the slits 203a disposed between the antenna patterns 204 arranged side by side, in a direction parallel to each antenna pattern 204 (left-right direction in FIGS. 13A and 13B). In addition, it is desirable to configure the size of the slit 203b and the location of the cut-out region 207 such that the length of the RFID unit in a direction orthogonal to the antenna pattern 204 (vertical direction in FIG. 13A) becomes not larger than the length of the slits 203b in the same direction which are formed at the opposite longitudinal ends of each antenna pattern 204.

For example, in FIGS. 12A and 12B, the width of the antenna substrate 203 may be made smaller than the width of the sheet laminates 206a and 206b, while the length of the cut-out region 207 in the direction of the width thereof may be made larger than the width of the antenna substrate 203. In this case, the slits 203b are not formed, and the opposite ends of the antenna substrate 203 in the direction of the length of the antenna pattern 204 are prevented from being exposed from the opposite ends of the RFID unit.

FIGS. 14A and 14B explain the reinforcing effects of the nylon mesh.

FIG. 14A illustrates the cross-section of a protective member used in the above-described RFID unit, i.e. a rubber sheet. When such a sheet member is bent such that an upper half thereof with respect to the center line of the sheet member, as viewed in FIG. 14A, becomes convex, in general, as illustrated on the right side in FIG. 14A, a tensile stress acts on the upper half of the sheet member, and a compressive stress acts on a lower half of the same.

In the RFID unit prepared in the present embodiment, the layers of the nylon mesh 201 are formed above and below the IC chip 205. Now, when nylon meshes 201 having a low elongation are used, as illustrated in FIG. 14B, if the RFID unit is bent such that an upper half thereof, as viewed in FIG. 14A, becomes convex, an upper nylon mesh 201 is less elongated, whereby the rubber sheet in the region of the upper nylon mesh 201 is difficult to be bent. Inversely, if the RFID unit is bent such that a lower half thereof, as viewed in FIG. 14B, becomes convex, a lower nylon mesh 201 is less elongated, and hence the rubber sheet in the region of the lower nylon mesh 201 is difficult to be bent, similarly to the above case. This makes it possible to positively protect the IC chip 205 from the bending force.

In the above-described second embodiment, the process step is employed in which a mesh-like material is used for making reinforcing members of the IC chips, and sheet laminates are prepared by arranging the mesh-like reinforcing members on a protective sheet member. This makes it possible to manufacture the RFID units from start to finish, by using rolls. Further, since a material that can be thermocompression-bonded is used for making the protective sheet member, it is possible to efficiently carry out the process step for laminating the above-mentioned sheet laminates and the antenna substrate having the IC chips mounted thereon and fixedly attaching the same. Furthermore, an elastic material is used as the protective sheet member, whereby when the sheet laminates and the antenna substrate are fixedly attached, it is possible to make flat the upper surface of the sheet laminate without performing particular positioning (of the sheet laminates and the IC chips) in the conveying direction of the sheet laminates and the antenna substrate. This makes it possible to manufacture a large number of RFID units, which are resistant to external forces, liquids or chemicals, at low costs.

Third Embodiment

By the way, the RFID unit manufactured in the above-described second embodiment is configured such that part of the reinforcing members or the antenna substrate is exposed from the side surface of the RFID unit. In contrast, according to the present embodiment, it is possible to efficiently manufacture an RFID unit which is configured to prevent reinforcing members or an antenna substrate from being exposed to the outside.

FIG. 15 is a flowchart illustrating the outline of a process for manufacturing RFID units according to the third embodiment.

[Step S31] In the third embodiment, the same reinforcing members as used in the above-described general RFID tag-manufacturing process are used. First, the reinforcing members are mounted on protective sheet members, which serve as exteriors. At this time, sprocket holes for use in positioning in later process steps are formed in advance. The protective sheet members having the reinforcing members mounted thereon are taken up by respective rolls.

[Step S32] On the other hand, noncontact IC chips are mounted on the above-described antenna substrate, and the antenna substrate is cut in units of the IC chip and the antenna pattern, whereby RFID inlets are prepared.

[Step S33] The RFID inlets are mounted on a sheet member, which serves as an intermediate layer. At this time, sprocket holes for use in positioning in later process steps are formed in advance in the sheet member. The sheet member having the RFID inlets mounted thereon are taken up by a roll.

[Step S34] The protective sheet members that have the reinforcing members mounted thereon and are to form an uppermost layer and a lowermost layer, respectively, the sheet member having the RFID inlets mounted thereon, and a sheet member serving as a spacer are laminated one upon another, and are fixedly attached to each other. Further, the members fixedly attached are cut out in units of respective regions of the RFID tags, whereby RFID units are completed. In this process step, by pulling out all the sheet members from the respective rolls thereof at the same speed, it is possible to fixedly attach the sheet members to each other and then cut out the RFID units.

Next, a more detailed description will be given of the above-described process steps.

FIGS. 16A and 16B explain a reinforcing member-mounting/hole-machining process step. FIG. 16A is a side view illustrating how this process step is carried out, and FIG. 16B is a plan view illustrating the same.

The process step illustrated in FIGS. 16A and 16B corresponds to the step S31 in FIG. 15. In this process step, a rubber sheet 301, which is a protective sheet member, is provided in a state wound around a roll 331. This protective sheet member forms the exterior of the RFID unit as a final product, and has the function of sealing the IC chip, the antenna pattern, the reinforcing members, and so forth, within each RFID unit. It suffices that this protective sheet member is made of the same material as that of the protective sheet members arranged on the nylon mesh 201 in the first embodiment.

In this process step, the rubber sheet 301 is pulled out from the roll 331 onto a stage 332, and reinforcing members 302 of the IC chips are mounted on an upper surface of the rubber sheet 301 at predetermined space intervals P, by a mounting tool 333. It suffices that as the reinforcing members 302, there are used ones made of the same material and having the same shape as that of the reinforcing members 104 used in the aforementioned general RFID tag-manufacturing process. Further, in the present embodiment, an adhesive agent 303 is attached to a lower surface of each reinforcing member 302. In the present embodiment, a double-faced tape is affixed as the adhesive agent 303 to the lower surface of the reinforcing member 302, by way of example. The reinforcing members 302 as described above are conveyed to predetermined positions on the rubber sheet 301 and are pressed against the rubber sheet 301, by the mounting tool 333. Alternatively, after the adhesive agent 303 is attached to the rubber sheet 301, the reinforcing member 302 may be affixed thereto.

Further, in this process step, positioning sprocket holes 304 are formed by a hole-making tool 334 at predetermined space intervals through the rubber sheet 301. It suffices that the space intervals at which the sprocket holes 304 are formed are equal to space intervals P at which the reinforcing members 302 are mounted.

The rubber sheet 301, which has the reinforcing members 302 mounted thereon and the sprocket holes 304 formed therethrough by the above process step, is taken up by a roll again. As this roll, there may be used the original roll 331 around which the rubber sheet 301 has been wound, or another roll provided on the side of the other end of the rubber sheet 301.

FIGS. 17A and 17B explain an RFID inlet-preparing process step. FIG. 17A is a side view illustrating how this process step is carried out, and FIG. 17B is a plan view illustrating the same.

The process step illustrated in FIGS. 17A and 17B corresponds to the step S32 in FIG. 15. In this process step, first, noncontact IC chips 312 are mounted on a antenna substrate 311 by the same procedure as employed in the IC chip-mounting process step in the general RFID tag-manufacturing process, described above with reference to FIGS. 3A and 3B. More specifically, as illustrated in FIGS. 17A and 17B, the antenna substrate 311 formed with antenna patterns 313 is pulled out from a roll 341 onto a stage 342. Then, the IC chips 312 are mounted on the antenna substrate 311 e.g. by flip chip bonding using a bonding tool 343, and terminals of the IC chips 312 are connected to associated ones of the antenna patterns 313. The materials and shapes of the antenna substrate 311 and the antenna patterns 313 may be the same as employed in the above-described general RFID tag-manufacturing process.

Next, on the stage 342, a region corresponding to a pair of one IC chip 312 and one antenna pattern 313 is punched by a punching die 344 along dotted lines in FIG. 17B, whereby a group of electronic components constituting an RFID tag is packaged, whereby the RFID inlet is prepared.

FIGS. 18A and 18B explain an RFID inlet-mounting/hole-machining process step. FIG. 18A is a side view illustrating how this process step is carried out, and FIG. 18B is a plan view illustrating the same.

The process step illustrated in FIGS. 18A and 18B corresponds to the step S33 in FIG. 15. In this process step, first, the RFID inlets prepared in the step S32 are mounted on a sheet member which serves as an intermediate layer of the RFID units. In the present embodiment, a rubber sheet 321 is used as the sheet member. It suffices that as the material of this sheet member, the same material as that of the protective sheet member serving as the exterior of the RFID unit may be used.

The rubber sheet 321 is provided in a state wound around a roll 351. When the rubber sheet 321 is pulled out from the roll 351 onto a stage 352, RFID inlets 322 are mounted on an upper surface of the rubber sheet 321 at predetermined space intervals, by a mounting tool 353. In the present embodiment, the RFID inlets 322 are mounted on the rubber sheet 321 at the same space intervals as the space intervals P at which the reinforcing members 302 are mounted on the rubber sheet 301 in the step S31.

Further, in the present embodiment, an adhesive agent 323 is applied to a lower surface of each RFID inlet 322. In the present embodiment, similarly to the process step in the step S31, a double-faced tape is affixed to the lower surface of the RFID inlet 322 as the adhesive agent 323, by way of example. The RFID inlets 322 as described above are conveyed to predetermined positions on the rubber sheet 321, pressed against the rubber sheet 321, and affixed thereto, by the mounting tool 353. Alternatively, after the adhesive agent 323 is attached to the rubber sheet 321, the RFID inlets 322 may be affixed to the adhesive agent 323.

Further, in this process step, positioning sprocket holes 324 are formed by a hole-making tool 354 at predetermined space intervals in the rubber sheet 321. It is necessary that the space intervals at which the sprocket holes 324 are formed are made equal to the space intervals P at which the sprocket holes 304 are formed in the step S31. Further, space intervals at which the sprocket holes 324 are formed in the direction of the width of the rubber sheet 321 are also made equal to the space intervals at which the sprocket holes 304 are formed in the step S31.

The rubber sheet 321 having the RFID inlets 322 mounted thereon and the sprocket holes 324 formed therethrough by the above process step, is taken up by a roll again. At this time, since the RFID inlets 322 mounted on the rubber sheet 321 have a relatively small thickness, it is possible to wind the above-described rubber sheet 321 around a roll relatively easily. As this roll, there may be used the original roll 351 around which the rubber sheet 321 has been wound, or another roll provided on the side the other end of the rubber sheet 321.

FIGS. 19A and 19B explain a sheet-attaching/unit-cutting process step. FIG. 19A is a side view illustrating how this process step is carried out, and FIG. 19B is a plan view illustrating the same.

The process step illustrated in FIGS. 19A and 19B corresponds to the step S34 in FIG. 15. In this process step, a rubber sheet 301a having the reinforcing members 302 mounted thereon in the step S31 is laminated to a lower side of the rubber sheet 321 having the RFID inlets 322 mounted thereon in the step S33. Further, to an upper side of the rubber sheet 321, a rubber sheet 301b having the reinforcing members 302 mounted thereon in the step S31 is laminated, with a spacer sheet 330 provided between the rubber sheet 321 and the rubber sheet 301b.

Here, the rubber sheets 301a and 301b are arranged with the reinforcing members 302 mounted thereon facing inward, respectively. Further, the spacer sheet 330 is a sheet member formed of the same material as that of the rubber sheets 301a, 301b and 321. Let it be assumed that the spacer sheet 330 has sprocket holes formed at the same space intervals as the space intervals at which the sprocket holes are formed through the rubber sheets 301a, 301b and 321.

As illustrated in FIGS. 19A and 19B, the rubber sheets 301a, 301b and 321 and the spacer sheet 330 are pulled out from rolls 361a, 361b, 362 and 363, respectively, and are conveyed to a location between sprocket wheels 364a and 364b. The sprocket wheels 364a and 364b have protrusions formed on outer peripheral surfaces thereof at the same space intervals, and the rubber sheets 301a, 301b and 321 and the spacer sheet 330 are conveyed while the above protrusions are sequentially inserted into sprocket holes formed in the rubber sheets 301a, 301b and 321 and the spacer sheet 330, respectively. This positions the IC chips and the reinforcing members 302 such that the reinforcing members 302 mounted on the rubber sheets 301a and 301b, respectively, are accurately arranged above and below the IC chips mounted on the rubber sheet 321.

Further, rollers 365a and 365b are provided on downstream sides of the respective sprocket wheels 364a and 364b, and the rubber sheets 301a, 301b and 321 and the spacer sheet 330 are conveyed while being vertically pressurized by the rollers 365a and 365b. At this time, for example, the rubber sheets 301a, 301b and 321 and the spacer sheet 330 are heated by the rollers 365a and 365b or by heat sources, not illustrated, other than the rollers 365a and 365b. This causes the adjacent sheets to be fixedly attached to each other by thermocompression bonding, whereby the RFID inlets 322 and the reinforcing members 302 are sealed.

Further, the sheets laminated one upon another, particularly the rubber sheet 321 and the spacer sheet 330 have elastic properties, and hence when the sheet members are heated by the rollers 365a and 365b, regions of the respective sheet members, brought into contact with the RFID inlets 322 and the reinforcing members 302, are contracted only by the heights of the RFID inlets 105 and the reinforcing members 302. This holds the upper surface of the whole sheet laminate approximately flat. To make flat the upper surface of the sheet laminate, e.g. recesses may be formed in advance in the rubber sheet 321 and the spacer sheet 330 in accordance with the shapes of the RFID inlets 322 and the reinforcing members 302.

The sheet members thermocompression-bonded to each other as described above are cut out on a stage 366 by a punching die 367 in units of regions each including one RFID inlet 105. The units cut out in this process step become RFID units, which are final products. In FIG. 19B, the region cut out by the punching die 367 is indicated as a cut-out region 370. Each cut-out region 370 is configured to be larger in area than the region of the RFID inlet 105 and the reinforcing members 302 associated therewith, whereby the RFID inlet 105 and the reinforcing member 302 are completely sealed with the upper and lower sheet members.

Although in the present embodiment, the sprocket holes are provided in the respective sheet members so as to position the RFID inlets 105 and the reinforcing members 302 during lamination of the sheet members, this is not limitative, but instead of such hole-like members, positioning cutouts may be provided in the lateral side portions of the sheet members. In this case, it suffices that in the lamination process step, the sheet members are conveyed with members, which correspond to the protrusions of the sprocket wheels, engaged with the cutouts of the sheet members. Further, any other suitable positioning method may be employed.

In the examples illustrated in FIGS. 19A and 19B, all of the rubber sheets 301a, 301b and 321 and the spacer sheet 330 are laminated one upon another at a time. However, a procedure may be employed in which adjacent ones of the sheet members are laminated in advance, and e.g. after taking up the sheet laminates by respective rolls, all the sheet members are finally laminated one upon another. In this case, the sheet members may be fixedly attached each time the adjacent ones of the sheet members are laminated one upon another, when the final lamination process step is executed.

FIGS. 20A and 20B illustrate an RFID unit prepared according to a third embodiment. FIG. 20A is a plan view illustrating the same, and FIG. 20B is a side view illustrating the same.

Referring to FIGS. 20A and 20B, in the RFID unit prepared in the present embodiment, the reinforcing members 302 are disposed above and below the IC chip 312 mounted on the RFID inlet 105, respectively. Now, a hard material can be used for the reinforcing member 302, as described hereinabove, so that it is possible to enhance the strength of the RFID unit compared with the case where a mesh-like material is used as in the second embodiment.

Further, the IC chip 312, the antenna pattern 313 and the antenna substrate 311 are all sealed within protective sheet members such that they are not exposed from the outer surfaces of the RFID unit. As a consequence, even when a liquid or a chemical is attached to the RFID unit, it is possible to prevent the liquid or the chemical from touching the IC chip 312 and the antenna pattern 313 within the RFID unit, thereby making it possible to cause the IC chip 312 to normally operate. Further, since the reinforcing members 302 as well are completely sealed within the protective sheet members, it is also possible to prevent the reinforcing members 302 from being corroded.

According to the above-described third embodiment, it is possible to manufacture the RFID units from start to finish, by using rolls. Further, since a material that can be thermocompression-bonded is used for the protective sheet members, it is possible to efficiently carry out the process step for laminating the protective sheet members and fixedly attaching the same. Furthermore, the positioning holes are formed through the laminated protective sheet members, whereby when the protective sheet members are laminated and fixedly attached to each other, it is possible to easily position the IC chips and the reinforcing members. This makes it possible to mass-produce the RFID units having the above-mentioned features, at low costs.

Although in the above-described third embodiment, the reinforcing members 302 are arranged above and below the IC chip 312, the RFID unit may be configured such that the reinforcing member 302 is disposed only above the IC chip 312. In this case, it suffices that in the sheet-attaching process step illustrated in FIGS. 19A and 19B, the arranging and fixedly attaching of the rubber sheet 301a below the IC chip 312 is omitted. That is, in this case, the rubber sheet 321 functions as a protective sheet, as an exterior, which protects the RFID inlet 322.

Fourth Embodiment

In the fourth embodiment, part of the manufacturing process according to the second embodiment is replaced by part based on another method. More specifically, the method of forming slits in the antenna substrate having IC chips mounted thereon for fixedly attaching the protective sheet members to each other is replaced by a method of mounting RFID inlets, each of which includes one IC chip and an antenna substrate, on an intermediate protective sheet member, thereby making it possible to fixedly attach the protective sheet members to each other.

FIG. 21 is a flowchart illustrating the outline of a process for manufacturing RFID units according to the fourth embodiment.

[Step S41] In this process step, the same method as employed in the step S21 in FIG. 9 is used to prepare a sheet laminate by sandwiching a mesh-like reinforcing member between protective sheet members. The prepared sheet laminate is taken up by a roll.

[Step S42] Separately from the step S41 for the above-described sheet laminate, a process step for mounting IC chips on a sheet member is performed. First, by the same method as employed in the steps S22 and S23 in FIG. 9, an antenna substrate formed with antenna patterns is prepared, and the IC chips are mounted on the antenna substrate.

[Step S43] A base sheet member is disposed on the antenna substrate having the IC chips mounted thereon. In this process step, the base sheet member having an adhesive agent attached thereto is fixedly attached to a lower surface of the antenna substrate, i.e. a surface of the antenna substrate where no IC chips are mounted.

[Step S44] Regions each including one IC chip and one antenna pattern connected thereto are punched from the protective sheet member whereby RFID inlets are prepared. In this process step, out of the laminated members, only the antenna substrate and a layer of the adhesive agent as a layer under the antenna substrate, are cut, and the antenna substrate except for the regions thereof corresponding to the RFID inlets is peeled off. Thus, a protective sheet member having only the RFID inlets mounted thereon is produced, and taken up by a roll.

[Step S45] The same method as employed in the step S25 in FIG. 9 is employed to sandwich the base sheet member having the RFID inlets mounted thereon between the sheet laminates prepared in the step S41 on the opposite sides thereof, whereby the adjacent sheet members are fixedly attached to each other. Further, the members fixedly attached are cut out in units of regions each including a RFID tag, whereby RFID units are completed.

Next, a more detailed description will be given of the above-described process steps.

First, the process step in the step S41 is the same as described above with reference to FIGS. 10A and 10B. Further, the process step in the step S42 is the same as the IC chip-mounting process step in the general RFID tag-manufacturing process, described above with reference to FIGS. 3A and 3B. Therefore, illustrations of these process steps are omitted.

FIG. 22 explains a base sheet member-laminating process step.

The process step illustrated in FIG. 22 corresponds to the step S43 in FIG. 21. Referring to FIG. 22, IC chips 402 are mounted on an antenna substrate 401 in the step S42, and the antenna substrate 401 is subjected to the FIG. 22 process step in a state wound around a roll 431. On the other hand, a rubber sheet 412 having one surface coated with an adhesive agent 411 is taken up by a roll 432. The rubber sheet 412 is wound around the roll 432 in a state in which a release paper 413 is affixed to a surface of the adhesive agent 411. This rubber sheet 412 is a sheet member which functions as a base substrate for mounting RFID inlets, and is made of the same material as that of the protective sheet member used in the step S41.

As illustrated in FIG. 22, the antenna substrate 401 and the rubber sheet 412 are pulled out from the rolls 431 and 432, respectively, and are conveyed to a location between rollers 433a and 433b. At this time, the release paper 413 affixed to the rubber sheet 412 is removed from the rubber sheet 412, and is taken up by a roller 434. Thus, a surface of the adhesive agent 411 of the rubber sheet 412 is brought into contact with the antenna substrate 401, whereby the rubber sheet 412 and the antenna substrate 401 are pressure-bonded to each other by the pressure between the rollers 433a and 433b. The rubber sheet 412 and the antenna substrate 401 pressure-bonded to each other are conveyed to a stage 435, and subjected to the next process step without being taken up by a roller.

It is desirable that the roller 433a that is brought into contact with the antenna substrate 401 is made of a material soft enough not to damage the IC chips 402 with its pressure.

FIGS. 23A and 23B explain an RFID inlet-punching process step. FIG. 23A is a side view illustrating how this process step is carried out, and FIG. 23B is a plan view illustrating the same.

The process step illustrated in FIGS. 23A and 23B corresponds to the step S44 in FIG. 21. The rubber sheet 412 and the antenna substrate 401 pressure-bonded by the above-described process step are subjected to the punching process step on the stage 435. In this process step, only the antenna substrate 401 and the layer of the adhesive agent 411 coated on the rubber sheet 412 are cut by a punching die 436, but the rubber sheet 412 is not cut.

After that, at the location of a roller 437, a portion of the antenna substrate 401, outside regions thereof cut by the punching die 436, is peeled off the rubber sheet 412, and is taken up e.g. by a roll 438. On the other hand, the rubber sheet 412 is taken up by a roll 439.

The region of the antenna substrate 401, cut by the punching die 436, is indicated by dotted lines in FIG. 23B. As illustrated in FIG. 23B, a region corresponding to a pair of the IC chip 402 and an antenna pattern 403 is cut by the punching die 436. Therefore, when only the outside of the regions cut by the punching die 436 is peeled off the rubber sheet 412, in the rubber sheet 412 taken up by the roll 439, only regions each including the IC chip 402 and the antenna pattern 403 remain affixed. That is, on this rubber sheet 412, RFID inlets 404 each having a group of electronic components constituting an RFID tag packaged therein are prepared.

The rubber sheet 412 to which the RFID inlets 404 prepared at this time are affixed has approximately the same configuration as that of the rubber sheet prepared in the RFID inlet-mounting process step (step S33 in FIG. 15) in the third embodiment. In the present embodiment, however, no sprocket holes are formed.

FIGS. 24A and 24B explain a sheet-attaching/unit-cutting process step. FIG. 24A is a side view illustrating how this process step is carried out, and FIG. 24B is a plan view illustrating the same.

The process step illustrated in FIGS. 24A and 24B corresponds to the step S45 in FIG. 21. The basic procedure employed in this process step is approximately the same as that employed in the sheet-attaching/unit-cutting process step in the step S25 in FIGS. 10A and 10B. Further, since the process step has been described with reference to FIGS. 12A and 12B, in FIGS. 24A and 24B, component parts and elements which are identical to those appearing in FIGS. 12A and 12B are denoted by identical reference numerals.

The process step illustrated in FIGS. 24A and 24B employs the rubber sheet 412 provided with the RFID inlets 404 that are prepared in the steps S42 to S44 in FIG. 21, in place of the antenna substrate 203 illustrated in FIGS. 12A and 12B. That is, the rubber sheet 412 and the sheet laminates 206a and 206b are pulled out from rolls 439, 242a and 242b, respectively, and are conveyed while being vertically pressurized by the rollers 243a and 243b. In accordance therewith, heat is applied e.g. by the rollers 243a and 243b, or from a heat source, not illustrated, other than the rollers 243a and 243b.

Thus, a rubber sheet as a lower layer of the sheet laminate 206a and an upper surface of the rubber sheet 412 are thermocompression-bonded to each other, whereby the IC chips 402 and the antenna patterns 403 are sealed with the rubber sheets. Further, a rubber sheet as an upper layer of the sheet laminate 206b and a lower surface of the rubber sheet 412 are also thermocompression-bonded to each other. Then, similarly to the second embodiment, the two rubber sheets within each of the sheet laminates 206a and 206b are also thermocompression-bonded to each other.

When all the above sheet members are pressure-bonded, the sheet laminate 206a is contracted according to the height of the RFID inlet 404, and therefore the upper surface of the sheet laminate 206a is held approximately flat. To make flat the upper surface of the sheet laminate 206a, e.g. recesses may be formed in advance in the rubber sheet e.g. according to the shape of each RFID inlet 404. However, in this case, in the process step for fixedly attaching the sheet laminates 206a and 206b that have the rubber sheet 412 therebetween, it is necessary to position the recesses on the sheet laminate 206a to the locations of the RFID inlet 404.

The sheet members thermocompression-bonded to each other as described above are cut out by the punching die 244 in units of regions each including one RFID inlet 404. The units cut out in this process step become RFID units, which are final products. In FIG. 24B, the region cut out by the punching die 244 is indicated as a cut-out region 405.

In the present embodiment, the sheet laminates 206a and 206b prepared in advance in the step S41 are subjected to the step S45. However, for example, in the step S45, the laminating and fixedly attaching of the sheet laminates 206a and 206b may be performed simultaneously with the laminating and fixedly attaching of the sheet laminates 206a and 206b and the rubber sheet 412.

Further, in the process step illustrated in FIGS. 24A and 24B, out of the sheet laminates 206a and 206b, as for the sheet laminate 206b fixedly attached to the lower surface of the rubber sheet 412, a rubber sheet thereof toward the rubber sheet 412 may be omitted such that the nylon mesh is brought into direct contact with the rubber sheet 412. However, by employing such a process step as illustrated in FIGS. 24A and 24B, it is possible to use the sheet laminates 206a and 206b manufactured for the opposite surfaces of the rubber sheet 412 by quite the same manufacturing process step, which makes it possible to simplify the manufacturing process step.

FIGS. 25A and 25B illustrate an RFID unit prepared according to the fourth embodiment. FIG. 25A is a plan view illustrating the same, and FIG. 25B is a side view thereof.

Referring to FIGS. 25A and 25B, in the RFID unit prepared in the present embodiment, similarly to the second embodiment, layers of the nylon mesh 201 are formed above and below the IC chips 402. This protects the IC chips 402 from external forces. Further, similarly to the second embodiment, end faces of the nylon mesh 201 are exposed from side surfaces of the RFID unit.

Further, in the RFID unit, the RFID inlet 404 including the IC chip 402 and the antenna patterns 403 is completely sealed with rubber sheets as protective members. That is, differently from the second embodiment, the whole antenna substrate 401 included in the RFID inlet 404 is sealed with the rubber sheets. This makes it possible to more firmly protect the IC chip 205 even when a liquid or a chemical is attached to the RFID unit.

According to the above-described fourth embodiment, a rubber sheet provided with an adhesive agent is used as a base sheet member of the RFID inlet, whereby it is unnecessary to cut off the RFID inlet once from a sheet member that can be taken up by a roll. This makes it possible to employ the manufacturing method which uses rolls from start to finish in the process for manufacturing the RFID units. Moreover, it is possible to manufacture RFID units which are configured such that RFID inlets therein are completely sealed with protective sheet members. This makes it possible to mass-produce RFID units, which resistant to external forces, liquids, and chemicals, at low costs.

Although in the above-described fourth embodiment, the nylon meshes 201 as reinforcing members are arranged above and below the IC chip 402, the nylon mesh 201 may be disposed only above the IC chip 402, for example. In this case, in the sheet-attaching process step illustrated in FIGS. 24A and 24B, the arranging and fixedly attaching of the sheet laminate 206b below the IC chip 402 are omitted. However, as described above with reference to FIGS. 14A and 14B, to ensure strength against a bending force, it is desirable to arrange the nylon meshes 201 both above and below the IC chip 402.

Fifth Embodiment

In the fifth embodiment, part of the manufacturing process according to the third embodiment is replaced by the process for manufacturing RFID inlets, according to the fourth embodiment.

FIG. 26 is a flowchart illustrating the outline of an RFID unit-manufacturing process according to the fifth embodiment.

[Step S51] In this process step, by the same method as employed in the step S31 in FIG. 15, a hard reinforcing member is mounted on a protective sheet member, and positioning sprocket holes are formed. The protective sheet member having the reinforcing member mounted thereon is taken up by a roll.

[Steps S52 to S54] In these process steps, by the same method as employed in the steps S42 to S44 in FIG. 21, a protective sheet member provided with the RFID inlets is prepared. However, differently from the above method, in the step S54, a process step for forming sprocket holes in the protective sheet member is added.

[Step S55] By the same method as employed in the step S34 in FIG. 15, the protective sheet member provided with the RFID inlets, the protective sheet members each having the reinforcing member mounted therein, for forming the upper most layer and the lowermost layer, and a sheet member as a spacer are laminated one upon another, and are fixedly attached to each other. Further, the members fixedly attached are cut out in units of regions each including an RFID tag, whereby RFID units are completed.

Next, a more detailed description will be given of the above-described process steps.

First, the process step in the step S51 is the same as described above with reference to FIGS. 16A and 16B. Further, the process step in the step S52 is the same as the IC chip-mounting process step in the general RFID tag-manufacturing process, described above with reference to FIGS. 3A and 3B. Furthermore, the process step in the step S53 is the same as described above with reference to FIG. 22. Therefore, illustrations of these process steps are omitted.

FIGS. 27A and 27B explain a hole-machining/RFID inlet-punching process step. FIG. 27A is a side view illustrating how this process step is carried out, and FIG. 27B is a plan view illustrating the same.

The process step illustrated in FIGS. 27A and 27B corresponds to the step S54 in FIG. 26. The basic procedure of this process step is approximately the same as the procedure of the RFID inlet-punching process step illustrated in the step S44 in FIG. 21. Further, this process step has also already been described with reference to FIGS. 23A and 23B, and hence in FIGS. 27A and 27B, component parts and elements which are identical to the component parts and elements appearing in FIGS. 23A and 23B are denoted by identical reference numerals. However, an antenna substrate 401a, a rubber sheet 412a and a roll 439a in FIGS. 27A and 27B correspond to the antenna substrate 401, the rubber sheet 412 and the roll 439 in FIGS. 23A and 23B, respectively.

The process step illustrated in FIGS. 27A and 27B is obtained by adding a process step for forming sprocket holes 501 to the process step described above with reference to FIGS. 23A and 23B. The sprocket holes 501 are formed by a hole-making tool 511 at predetermined space intervals in the antenna substrate 401a and the rubber sheet 412a. Now, the space intervals at which the sprocket holes 501 are formed are the same as the space intervals at which the sprocket holes are formed in the step S51. The process step for forming the sprocket holes 501 is not limitatively performed before the process step for cutting the antenna substrate 401a by the punching die 436 but it may be performed after the cutting process step. For example, after removing an unwanted region of the antenna substrate 401a from the rubber sheet 412a, the sprocket holes 501 may be formed through the rubber sheet 412a.

By carrying out the above process steps, the rubber sheet 412a taken up by the roll 439a has only regions affixed thereto each of which include the IC chip 402 and the antenna pattern 403. That is, on this rubber sheet 412a, there are formed the RFID inlets 404 in each of which a group of electronic components constituting an RFID tag are packaged. The rubber sheet 412a to which the RFID inlets 404 formed at this time are affixed has approximately the same configuration as that of the rubber sheet prepared in the RFID inlet-mounting process step (step S33 in FIG. 15) in the third embodiment.

FIGS. 28A and 28B explain a sheet-attaching/unit-cutting process step. FIG. 28A is a side view illustrating how this process step is carried out, and FIG. 28B is a plan view illustrating the same.

The process step illustrated in FIGS. 28A and 28B corresponds to the step S55 in FIG. 26. The basic procedure employed in this process step is the same as that employed in the sheet-attaching/unit-cutting process step in the step S34 in FIG. 15 in the third embodiment. Further, since the process step has been described with reference to FIGS. 19A and 19B, in FIGS. 28A and 28B, component parts and elements which are identical to those appearing in FIGS. 19A and 19B are denoted by identical reference numerals.

The process step illustrated in FIGS. 28A and 28B employs the rubber sheet 412a provided with the RFID inlet 404 that is prepared in the step S54 in FIG. 26, in place of the rubber sheet 321 provided with the RFID inlet 322 illustrated in FIGS. 19A and 19B. The rubber sheet 412a is pulled out from the roll 439, and is conveyed by the sprocket wheels 364a and 364b. The rubber sheet 412a, the rubber sheets 301a and 301b as the lower layer and the upper layer, and the spacer sheet 330 are laminated one upon another, and are thermocompression-bonded to each other.

When all the above sheet members are pressure-bonded, the spacer sheet 330 is contracted according to the height of the RFID inlet 404, whereby the upper surface of the sheet laminate is held approximately flat. To make flat the upper surface of the sheet laminate, e.g. recesses may be formed in advance in the spacer sheet 330 according to the shape of the RFID inlet 404.

The sheet members thermocompression-bonded to each other as described above are cut out on the stage 366 by the punching die 367 in units of regions each including one RFID inlet 404. The units cut out in this process step become RFID units, which are final products. In FIG. 28B, the region cut out by the punching die 367 is indicated as a cut-out region 370. The cut-out region 370 is configured to be larger in area than the region of the RFID inlet 404 and the reinforcing members 302 associated therewith, whereby the RFID inlet 404 and the reinforcing members 302 are completely sealed with the upper and lower sheet members.

Although in the present embodiment, the sprocket holes are provided through the respective sheet members so as to position the RFID inlets 404 and the reinforcing members 302 during lamination of the sheet members, this is not limitative, but similarly to the above-described third embodiment, instead of such hole-like members, positioning cutouts may be provided in the lateral side portions of the sheet members. Further, any other positioning suitable method may be employed.

In the examples illustrated in FIGS. 28A and 28B, all of the rubber sheets 301a, 301b and 412a and the spacer sheet 330 are laminated one upon another at a time. However, a procedure may be employed in which adjacent ones of the sheet members are laminated in advance, and e.g. after taking up the sheet laminates by respective rolls, all the sheet members are finally laminated one upon another. In this case, the sheet members may be fixedly attached each time the adjacent ones of the sheet members are laminated one upon another or which a final lamination process step is executed.

FIGS. 29A and 29B illustrate an RFID unit prepared according to the fifth embodiment. FIG. 29A is a plan view of the RFID unit, whereas FIG. 29B is a side view of thereof. In FIGS. 29A and 29B, component parts and elements which are identical to those appearing in FIGS. 20A and 20B are denoted by identical reference numerals.

Referring to FIGS. 29A and 29B, the RFID unit prepared in the present embodiment has approximately the same configuration as that of the RFID unit prepared in the third embodiment and illustrated in FIGS. 20A and 20B. That is, the reinforcing members 302 are arranged above and below the IC chip 402 mounted on the RFID inlet 404, respectively. Further, the IC chip 402, the antenna patterns 403, the antenna substrate 401 and the reinforcing members 302 are all sealed within the protective sheet member, and are prevented from being exposed from the RFID unit.

According to the above-described fifth embodiment, it is possible to more efficiently manufacture the RFID units having the same features as those of the RFID unit made in the third embodiment. More specifically, in the fifth embodiment, a rubber sheet provided with an adhesive agent is used as a base sheet member for the RFID inlets, whereby it is unnecessary to cut off the RFID inlets once from a sheet member that can be taken up by a roll. This makes it possible to employ the manufacturing method which uses rolls from start to finish in the RFID unit-manufacturing process.

Although in the above-described fifth embodiment, the reinforcing members 302 are arranged above and below each IC chip, similarly to the above-described third embodiment, the reinforcing member 302 may be disposed only above the IC chip, for example. In this case, it is possible that in the sheet-attaching process step illustrated in FIGS. 28A and 28B, the arranging and fixedly attaching of the lower rubber sheet 301a are omitted.

Further, in the above-described second to fifth embodiments, in the respective sheet-attaching process steps in the step S25 in FIGS. 6A and 6B, the step S34 in FIG. 15, the step S45 in FIG. 21, and the step S55 in FIG. 26, the sheet members may be fixedly attached by using e.g. ultrasonic waves, in place of by thermocompression bonding. Alternatively, the sheet members may be fixedly attached by using an adhesive agent. However, when the adhesive agent is used, a process step for applying the adhesive agent to required surfaces of the antenna substrate or the sheet member is necessitated. In contrast, if a method using no adhesive agent is used, as in the above-described embodiments, it is possible to fixedly attach a plurality of sheet members at a time, which makes it possible to enhance manufacturing efficiency. Further, if the method of fixedly attaching sheet members directly to each other without using any adhesive agent, sheet members in layers become difficult to be peeled off, thereby making it possible to seal the inside of each RFID unit more positively. Furthermore, whichever attaching method may be used, it is desirable to pressurize sheet members such that the surface of a sheet laminate is made flat.

As described hereinabove, since a circuit chip and reinforcing members are arranged in respective different sheet members, the bending resistances of the respective sheet members becomes lower than when the circuit chip and the reinforcing members are mounted on the same sheet member, which makes it possible to take up the sheet members. Further, at the stage where the above sheet members are laminated one upon another, there are formed RFID tags in a final form before being cut out. Therefore, it is possible to cut out final products in this state, and hence the sheet member laminate is not wound around a roll in a state in which both the circuit chips and the reinforcing members are mounted thereon.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that various changes, substitutions and alterations could be made hereto without departing from the spirit and scope of the invention.

What is claimed is:

1. A method of manufacturing an RFID tag, comprising:
    forming a base sheet member that includes a first sheet member in tape form and unit base substrates on the first sheet member, wherein each of the unit base substrates is formed with a conductive pattern functioning as an antenna and has a non-contact communication-type circuit chip
    mounted thereon which is connected to the conductive pattern, and the unit base substrates are fixedly attached to the first sheet member with predetermined spaces along a direction of length of
    the first sheet member;
        laminating a second sheet member and a third sheet member each in tape form elongating in
    the direction of length of the first sheet member and having elastic properties, one upon another, in a
    state where reinforcing members for reinforcing the circuit chips are arranged between the second
    sheet member and the third sheet member at the same space intervals as the space intervals at which
    the circuit chips are arranged, thereby forming an upper-layer sheet member, and laminating the upper-layer sheet member on a side of the base sheet member formed by said forming where each
    unit base substrate is laminated, in a state where the reinforcing members are respectively aligned with the circuit chips;
        cutting out regions each including one of the unit base substrates sequentially from a sheet
    laminate formed by said laminating, and
        forming openings in regions except the conductive patterns and the circuit chips, wherein
    one of the sheet members of the upper-layer sheet member and one of sheet members of a lower-layer sheet member toward the base substrate are fixedly attached to each other via the
    openings in the unit base substrate.

2. The method according to claim 1, further comprising sequentially mounting the circuit chips on a base substrate in tape form having the conductive patterns formed thereon with the predetermined spaces along a direction of length of the base substrate, and connecting the circuit chips to associated ones of the conductive patterns,
    wherein said forming comprises:
    affixing the first sheet member having an adhesive agent attached to one surface of the first sheet member to a surface of the base substrate, opposite from a surface of the base substrate having the circuit chips mounted thereon, via the adhesive agent;
    cutting, on the first sheet member to which the base substrate is affixed, a periphery of each of regions each containing one of the circuit chips and one of the conductive patterns connected to the one of the circuit chips, only through a layer of the base substrate and a layer of the adhesive agent; and
    peeling only an outward region of the periphery of the region of the base substrate off the first sheet member, thereby forming the base sheet member having the unit base substrates fixedly attached thereto.

3. The method according to claim 1, wherein said laminating comprises laminating the second sheet member on the base sheet member and laminating the third sheet member on the second sheet member, the reinforcing members separated on a circuit chip-by-circuit chip basis are fixedly attached to a surface of the third sheet member which faces the second sheet member at the same space intervals as the space intervals at which the circuit chips are arranged; and
    wherein in said cutting, the regions each containing one of the unit base substrates and one of the reinforcing members associated with the circuit chip on the one of the unit base substrates are sequentially cut out from the sheet laminate formed by laminating the upper-layer sheet member and the base sheet member.

4. The method according to claim 3, wherein in said laminating, the first sheet member and the second sheet member, and the second sheet member and the third sheet member are thermocompression-bonded, respectively.

5. The method according to claim 3, wherein in said laminating, the first sheet member, the second sheet member and the third sheet member are conveyed and laminated one upon another, while positioning holes or cutouts formed in the first sheet member, the second sheet member and the third sheet member at the same space intervals, respectively, whereby the circuit chips and associated ones of the reinforcing members are positioned to each other, respectively.

6. The method according to claim 3, wherein the first sheet member is made of an elastic material, and
    wherein in said laminating, a fourth sheet member having elastic properties and having lower layer-side reinforcing members separated on a circuit chip-by-circuit chip basis fixedly attached thereto at the same space intervals as the space intervals at which the circuit chips are arranged, is further laminated on a surface of the first sheet member, opposite from the surface of the first sheet member having the unit base substrates fixedly attached thereto, in a state where the lower layer-side reinforcing members are respectively aligned with the circuit chips.

7. The method according to claim 1, wherein said laminating comprises laminating a mesh-shaped reinforcing member between the second sheet member and the third sheet member, the mesh-shaped reinforcing member is wide enough to contain at least the circuit chips and elongates in a direction of length of the second member and third member in a state where the mesh-shaped reinforcing member is located over the circuit chips, each of the reinforcing members is arranged as a part of the mesh-shaped reinforcing member.

8. The method according to claim 7, wherein in said laminating, a lower-layer sheet member formed by sandwiching a lower layer-side mesh-shaped reinforcing member similar to the mesh-shaped reinforcing member between a fourth sheet member and a fifth sheet member each having elastic properties is further laminated on a surface of the first sheet member, opposite from the surface of the first sheet member having the unit base substrates fixedly attached thereto, in a state where the lower layer-side mesh-shaped reinforcing member is located over the circuit chips.

9. The method according to claim 7, wherein in said laminating, the first sheet member and the second sheet member, and the second sheet member and the third sheet member are thermocompression-bonded, respectively.

10. The method according to claim 8, further comprising forming the upper-layer sheet member by sandwiching the mesh-shaped reinforcing member between the second sheet member and the third sheet member and taking up the mesh-shaped reinforcing member together with the second sheet member and the third sheet member by a roll, wherein in said laminating, the upper-layer sheet member is pulled out from the roll for being processed.

11. A method of manufacturing an RFID tag, comprising:
laminating on opposite surfaces of a base substrate in tape form having conductive patterns for functioning as antennas formed at predetermined space intervals in a direction of length of the base substrate, having non-contact communication-type circuit chips connected to associated ones of the conductive patterns mounted thereon, respectively, and further having openings formed in regions except the conductive patterns and the circuit chips, an upper-layer sheet member and a lower-layer sheet member each having a mesh-shaped reinforcing member arranged between two sheet members each having elastic properties in a sandwiched manner, wherein the mesh-shaped reinforcing member is wide enough to contain at least the circuit chips and elongates in a direction of length of the upper-layer sheet member and the lower-layer sheet member in a state where the mesh-shaped reinforcing member is located over the circuit chips, such that the sheet members of each of the upper-layer sheet member and the lower-layer sheet member are fixedly attached to each other, and that one of the sheet members of the upper-layer sheet member and one of the sheet members of the lower-layer sheet member toward the base substrate are fixedly attached to each other via the openings in the base substrate; and
cutting out regions each containing one of the circuit chips and one of the conductive patterns connected to the one of the circuit chips and including at least part of the openings, sequentially from a laminate member which has the upper-layer sheet member and the lower-layer sheet member laminated one upon another with the base substrate therebetween.

12. The method according to claim 11, wherein in said laminating, the sheet members of each of the upper-layer sheet member and the lower-layer sheet member, and one of the sheet members of the upper-layer sheet member and one of the sheet members of the lower-layer sheet member toward the base substrate are thermocompression-bonded to each other.

13. The method according to claim 11, further comprising forming each of the upper-layer sheet member and the lower-layer sheet member by sandwiching the mesh-shaped reinforcing member between the two sheet members and taking up the mesh-shaped reinforcing member together with the two sheet members by a roll,
wherein in said laminating, the upper-layer sheet member and the lower-layer sheet member are pulled out from the rolls, respectively, for being processed.

* * * * *